US011216631B2

(12) United States Patent
Luk et al.

(10) Patent No.: US 11,216,631 B2
(45) Date of Patent: Jan. 4, 2022

(54) CONTRAST EDGE BARCODES

(71) Applicant: Avocado Scan, Inc., New York, NY (US)

(72) Inventors: Winson Luk, New York, NY (US); Alex Yang, Sunnyvale, CA (US)

(73) Assignee: Avocado Scan, Inc., New York, NY (US)

( * ) Notice: Subject to any disclaimer, the term of this patent is extended or adjusted under 35 U.S.C. 154(b) by 0 days.

(21) Appl. No.: 17/239,399

(22) Filed: Apr. 23, 2021

(65) Prior Publication Data
US 2021/0334490 A1  Oct. 28, 2021

Related U.S. Application Data

(60) Provisional application No. 63/014,709, filed on Apr. 24, 2020.

(51) Int. Cl.
*G06K 7/14* (2006.01)
*G06K 19/06* (2006.01)

(52) U.S. Cl.
CPC ......... *G06K 7/1456* (2013.01); *G06K 7/1413* (2013.01); *G06K 19/06028* (2013.01)

(58) Field of Classification Search
CPC ............... G06K 7/1413; G06K 7/1491; G06K 19/06028; G06K 9/0026; G06K 9/0002; G06K 9/0033; G06K 9/0004; G06K 9/00046
USPC .......... 235/462.17, 462.16, 462.01, 454, 375
See application file for complete search history.

(56) References Cited

U.S. PATENT DOCUMENTS

| | | | | |
|---|---|---|---|---|
| 10,346,661 B2* | 7/2019 | Lin | ................ | G06K 19/06037 |
| 2011/0285746 A1* | 11/2011 | Swic | .................... | H04N 9/0451 |
| | | | | 345/597 |
| 2019/0370620 A1* | 12/2019 | Shen | ................ | G06K 19/06056 |
| 2020/0228675 A1* | 7/2020 | Chadwick | ............ | H04N 1/3232 |
| 2021/0117953 A1* | 4/2021 | Irukula | ................ | G06K 7/1413 |

* cited by examiner

*Primary Examiner* — Edwyn Labaze
(74) *Attorney, Agent, or Firm* — Cognition IP, P.C.; Edward Steakley

(57) ABSTRACT

Systems and methods for generating, reading, and using contrast barcodes for information access is disclosed. A code is received and embedded into one or more edges within or alongside an object by adjusting gamuts such as colors to create contrast. In example embodiments, an image of an object embedded with a contrast edge barcode is received from a user device. A plurality of axis points is defined along an area in the image containing a contrast edge barcode. Data encoded in the pixels along the axis points are decoded by detecting a contrast in colors.

14 Claims, 12 Drawing Sheets

CONTRAST EDGE BARCODES

CROSS-REFERENCE TO RELATED APPLICATIONS

This application claims the benefit of U.S. Provisional Application No. 63/014,709, filed 24 Apr. 2020, which is hereby incorporated by reference in its entirety.

FIELD OF INVENTION

Generally, the present invention relates to the field of machine-readable symbols. Specifically, the invention relates to generating and decoding barcodes within object edges using contrast.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Barcodes are machine-readable representations of data typically comprising a pattern of dark elements and light spaces. Traditional barcodes are one dimensional and black and white in color, such as a Universal Product Code (UPC) and EAN/JAN codes, which comprise parallel black lines of varying widths and spaces. However, barcodes are no longer restricted to a single dimension or color, with modern barcodes offering enhanced data storage capability, responsiveness, robustness, and visual appeal compared to their traditional one-dimensional, black and white counterpart. Several different modern barcode designs exist, including Quick Response (QR) codes, which encode information in a regular grid of black and white pixels with visible tracking markers, High Capacity Color Barcode (HCCB), which uses color to encode information, and other barcodes that may employ rectangles, dots, hexagons or other geometric patterns to represent data.

Originally, barcodes were scanned by specialized optical scanners called barcode readers. More recent software developments have provided the ability for other electronic devices such as smartphones to read barcodes. The prevalence of smartphones and the accessibility of mobile barcode scanner application software allows for widespread adoption of barcode technology in industries such as marketing, without requiring a specialized, bulky and expensive barcode scanner. For example, companies can attract potential customers' attention with barcodes printed on magazine advertisements. A potential customer can see the barcode, take a photo snapshot of the barcode using a smartphone, and retrieve the coupon encoded in the barcode.

Barcodes can be created or arranged alongside objects that include many additional images, features, and background text to increase visual appeal, especially when used in advertisements. Accordingly, to successfully obtain data from a barcode, data readers must be able to distinguish the target barcodes from the surrounding environment. Conventional barcodes commonly contain multiple conspicuous tracking markers for detection of the barcode and comprise high contrast patterns to assist with decoding. Such conspicuous and visible markings can be unsightly and often disrupt the appearance of advertisements or other media.

Thus, what is needed are techniques, methods, apparatuses, devices, or systems that overcome these disadvantages.

SUMMARY

Those skilled in the art will readily appreciate that the description given herein is for explanatory purposes as the invention extends beyond the limitations (if any) described herein. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices described and shown herein.

It is also to be understood that the terminology used herein is used for the purpose of describing particular embodiments only, and is not intended to limit the scope of the present invention.

All conjunctions used are to be understood in the most inclusive sense possible. Thus, the word "or" should be understood as having the definition of a logical "or" rather than that of a logical "exclusive or" unless the context clearly necessitates otherwise.

Structures described herein are to be understood also to refer to functional equivalents of such structures. Language that may be construed to express approximation should be so understood unless the context clearly dictates otherwise.

In accordance with one or more embodiments and corresponding disclosure, various non-limiting aspects are described in connection with a barcode that robustly holds data, which is meaningful to machines, while preserving the visual quality of an object amidst the barcode, which is meaningful to humans. The barcode (herein called a "contrast barcode") is embedded on one or more edges of the object. The subject application describes various systems and methods that can facilitate embedding the contrast barcode onto the object, detecting the contrast barcode embedded on the object within a practical environment, and decoding the embedded information from the contrast barcode. Compared with the prior art, the present invention provides the following advantages: integration of objects with barcodes without distorting or obscuring the object, elimination of traditional tracking markers, which are often conspicuous and unsightly, significant enhancement of visual coherence between barcodes and objects, flexibility and portability of barcodes, the ability to encode a variable number of bits, and the ability to embed barcodes on nonlinear, three-dimensional, or sequences of objects.

Some embodiments according to the present disclosure provide an alternative and, in some applications, more practical way of generating, presenting, reading, and interpreting barcodes. By generating a contrast barcode such that gamut differences (herein called "tint" or "contrast") encode the data held by the contrast barcode (e.g., a binary code), a more practical alternative to conventional barcodes may be obtained, depending on the application. In some embodiments, color may be used as the gamut, and a contrast barcode may, for example, be created to accompany an object for visual consistency. The barcode may contain colors that work better (e.g., better fit or blend) with the object as a whole. The contrast barcode may be designed to mimic, in its visual appearance, the style and color of the object on which it is embedded for a transparent or camouflage effect. In other embodiments, a contrast barcode may be designed with higher contrast or specific colors to convey, in its visual appearance, a consistent theme (e.g., a branding identity or a Christmas theme). In various embodiments, a portable contrast barcode may be created for embedding onto digital or physical surfaces.

Embedding the contrast barcode amidst the object is described in an aspect or embodiment herein. In one possible configuration and by non-limiting example, there is a method for generating a barcode, the method comprising: obtaining, by a processor, an object and data to embed within the object; generating, by a processor, an error-corrected code of said data; determining, by a processor, the number of bits to embed on axes on an object; determining, by a processor, a graphical representation of each bit to embed as a block; generating, by a processor, a barcode for each axis; embedding each barcode onto an object's edges.

According to another aspect of the present disclosure, there is provided a computer program product having computer-executable components for causing a code generator to perform an embodiment of a method of the present disclosure when the computer-executable components are run on processing circuitry comprised in the code generator, whereby the code generator is configured to perform an embodiment of an encoding method in accordance with the present disclosure.

Decoding a message embedded into the barcode is described in a further aspect or embodiment herein. In one possible configuration, there is provided an image capture device for reading a contrast barcode. The image capture device includes processing circuitry and memory storage storing instructions executable by the processing circuitry whereby the image capture device captures a digital image with an image sensor of the image capture device. The image capture device is also configured to identify an image area in the captured digital image, determine that the image area having the contrast barcode exceeds a matching threshold; within the image area, find the optical markers, object features, and edge axes of the contrast barcode in the image area; for each axis of the image, define the barcode axis and reference axis along the edge axis; define a plurality of axis points along each axis; for each axis point, determine median color values of an area surrounding the points; translate differences in barcode and reference color values to bits; concatenate bits from each axis into a singular binary code; apply error correction to the binary code to extract the code embedded in the image; and store the code to the memory.

According to another aspect of the present disclosure, there is provided a computer program product comprising computer-executable components for causing an image capture device to perform an embodiment of a decoding method of the present disclosure when the computer-executable components are run on processing circuitry of the image capture device.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

The invention will be described with reference to details discussed below, accompanied by drawings. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of any embodiments of the present inventions.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Those skilled in the art will readily recognize, in light of and in accordance with the teachings of the present invention, that any of the foregoing steps may be suitably replaced; reordered, removed and additional steps may be inserted depending upon the needs of the particular application.

The present invention will now be described in detail with reference to embodiments thereof as illustrated in the accompanying drawings.

Figure 1:
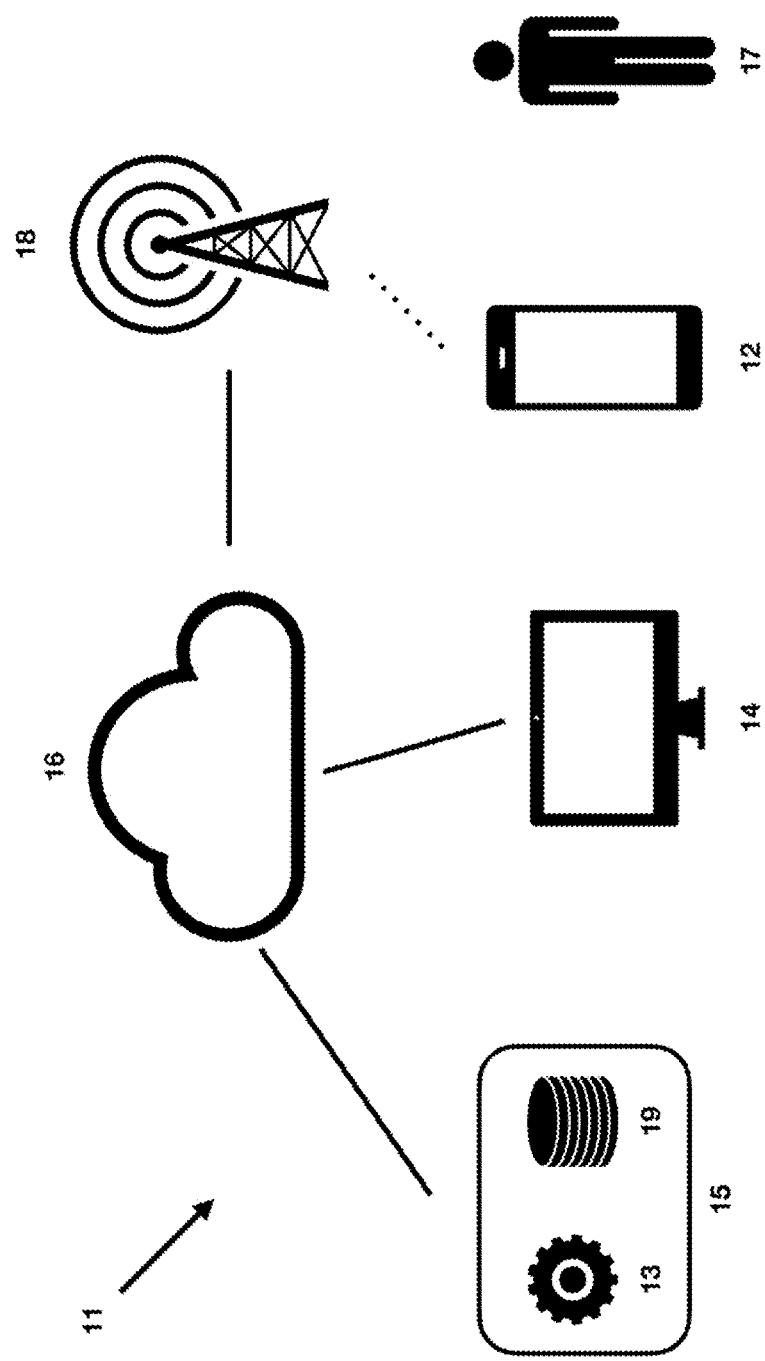
FIG. 1 illustrates a schematic diagram of an example communication network system with which aspects of technologies disclosed herein may be used, according to an embodiment of the present invention.

FIG. 1 illustrates a schematic diagram of an example communication network system with which aspects of technologies disclosed herein may be used, according to an embodiment of the present invention. FIG. 1 illustrates an example embodiment of a communication network system 11 with which aspects of technologies disclosed herein may be used. The system 11 includes an image capture device 12, such as a wired or wireless device (e.g., a radio device) having an image sensor for capturing an image. In some examples, the image capture device 12 may be any device or user equipment (UE), whether mobile or stationary, enabled to communicate over a radio channel in a communication network system 11. For instance, the device 12 may, but need not, be limited to, a mobile phone, a smartphone, a media player, a camera, a tablet computer, a laptop, a personal computer (PC), or a consumer electronic device. The figure illustrates a user 17 using the image capture device 12.

Where the image capture device 12 is a radio device, it may be connected to a network such as a Packet Data Network (PDN) 16 (e.g., the Internet) via any Radio Access Network (RAN) 18 (e.g., a Local Area Network (LAN) or a cellular network in accordance with a Third Generation Partnership Project (3GPP) communication standard) having one or more base stations.

The image capture device 12 may be in the vicinity of an object 14 containing a contrast barcode. For instance, the object 14 may be, but need not be limited to, a television, a computer monitor, a mobile phone, a printed publication, a lenticular print, or a physical product with an embedded contrast barcode. It will be appreciated that the contrast barcode can be displayed in a variety of manners on the object, such as on a user device display, a computer display, woven or otherwise affixed to an article of clothing or another product, or included in a variety of printed items. The image capture device 12 can use its image sensor to capture an optical digital image of the object.

The object 14 can be included in or communicatively connected to a code generator 13 (e.g., via the PDN 16). The code generator 13 is configured to generate a contrast barcode for display in object 14. The code generator 13 may, for example, be hosted by a service provider (SP) 15 having a server 19.

Figure 2:
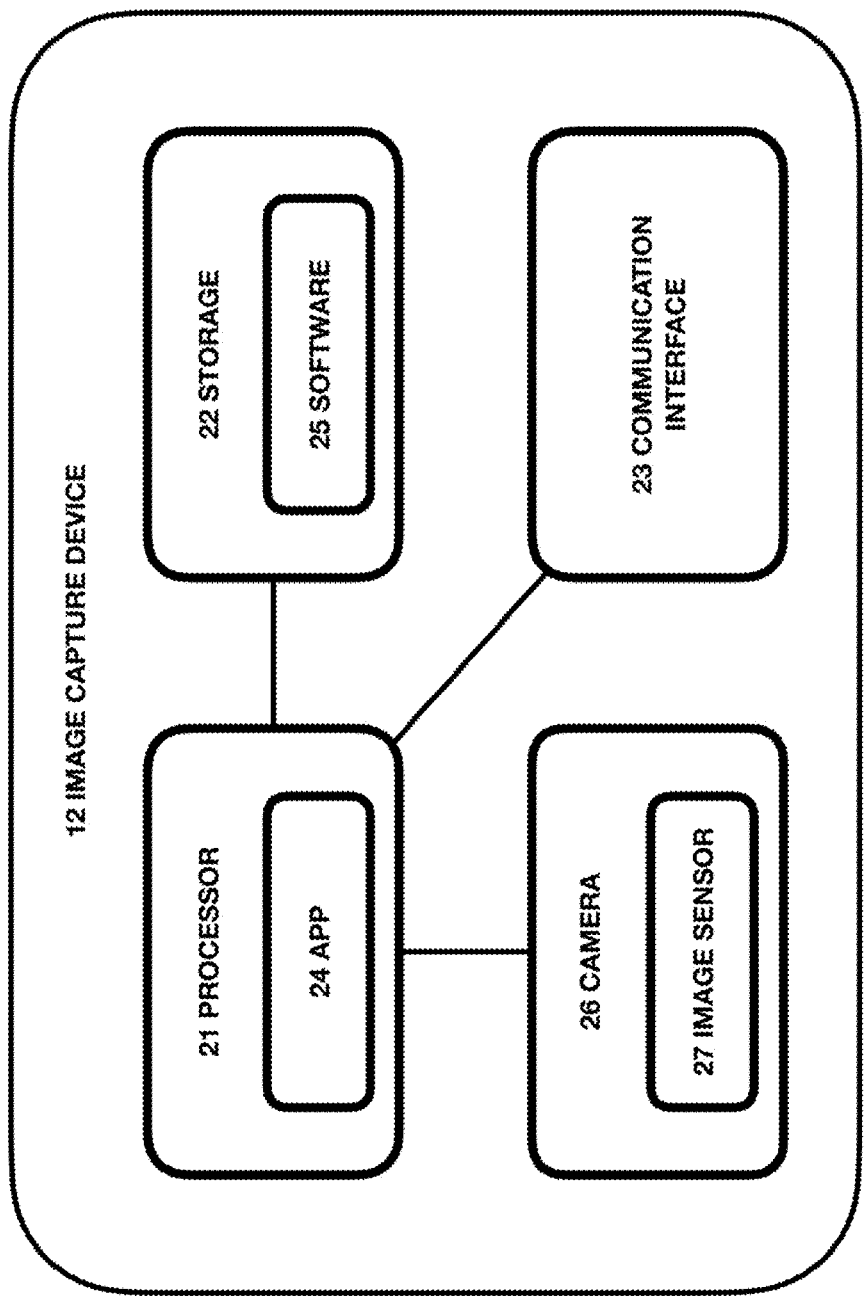
FIG. 2 illustrates a schematic block diagram of an example image capture device, according to an embodiment of the present invention.

FIG. 2 illustrates a schematic block diagram of an example image capture device, according to an embodiment of the present invention. FIG. 2 illustrates an example embodiment of the image capture device 12 (e.g., a smartphone). The image capture device 12 includes processing circuitry 21 (e.g., a central processing unit). The processing circuitry 21 can include one or more processing units in the form of microprocessor(s).

However, other suitable devices with computing capabilities can make up the processing circuitry 21, such as an application specific integrated circuit (ASIC), a field programmable gate array (FPGA), or a complex programmable logic device (CPLD). The processing circuitry 21 can be configured to run one or several computer program(s) or software (SW) 25 (see also FIG. 4) stored in a storage 22 of one or more storage unit(s) (e.g., memory). The software 25 can include, for example application software for a software application (app) 24 for making the image capture device 12 perform an embodiment of a method of the present disclosure. The app 24 can be formed by the processing circuitry 21 running the application software. The storage 22 can be regarded as a computer readable medium (see, e.g., computer readable medium 42 of FIG. 4). The computer readable medium can include, for example, Random Access Memory (RAM), flash memory, other solid-state memory, a hard disk, or combinations thereof. The computer readable medium can include a non-transitory computer readable medium. The processing circuitry 21 can be configured to store data in the storage 22, as needed.

The image capture device 12 can also include an image sensor 27. The image sensor 27 is typically a portion of a camera 26 integrated in the image capture device 12. The image sensor 27 may take various forms, including, for example, a semiconductor charge-coupled devices (CCD), or active pixel sensors in complementary metal-oxide-semiconductor (CMOS), or N-type metal-oxide-semiconductor (NMOS, Live MOS) image sensor. Further, the image capture device 12 may include a communication interface 23 (e.g., a radio interface) for communication within the communication network system 11 (e.g., with the SP 15) such as with the server 19 thereof.

Figure 3:
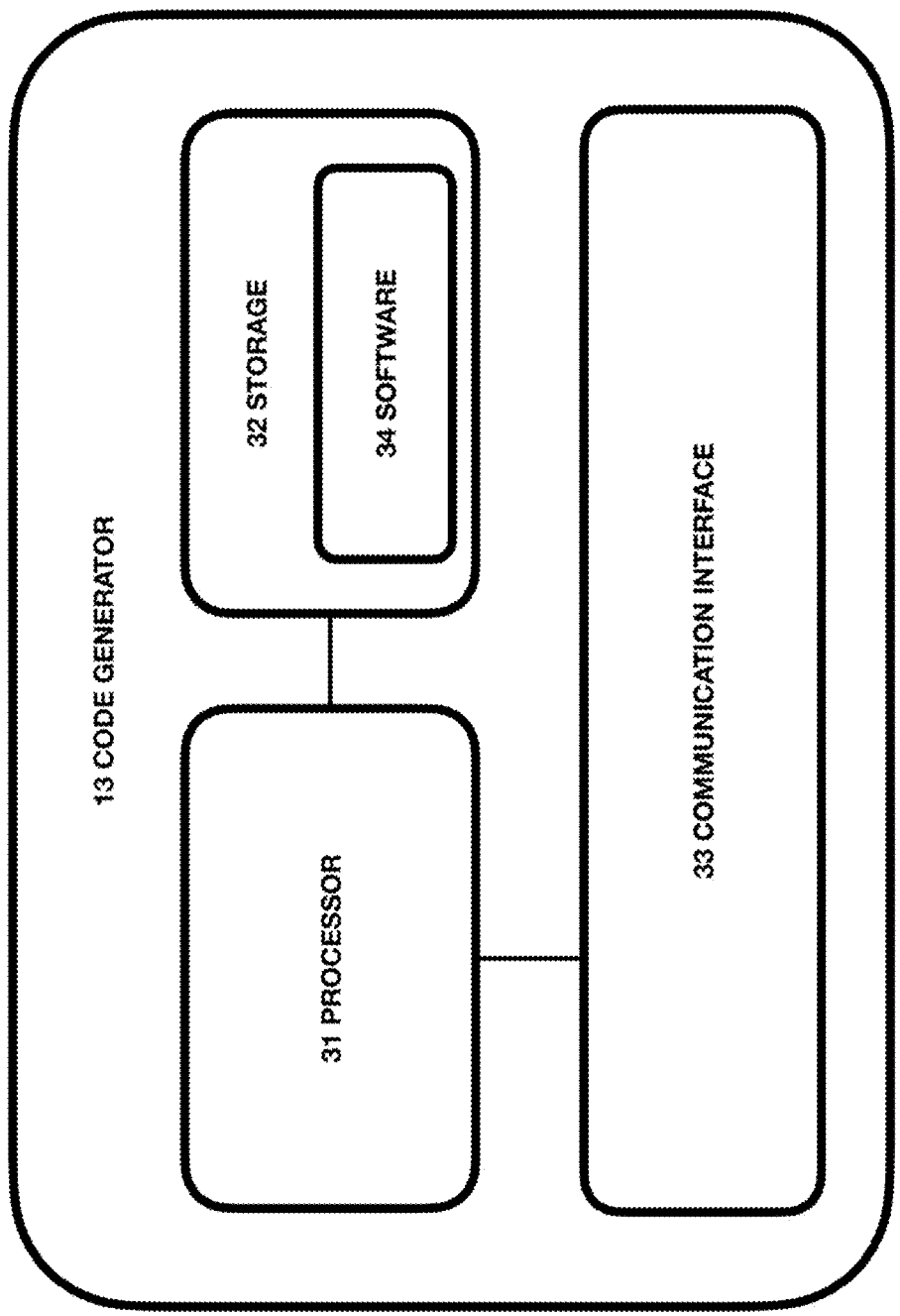
FIG. 3 illustrates a schematic block diagram of an example code generator, according to an embodiment of the present invention.

FIG. 3 illustrates a schematic block diagram of an example code generator, according to an embodiment of the present invention. FIG. 3 illustrates an example embodiment of a code generator 13. The code generator 13 can include processing circuitry 31 (e.g., a central processing unit). The processing circuitry 31 can include one or more processing units in the form of microprocessors. However, other suitable devices with computing capabilities can also be included in the processing circuitry 31 (e.g., an ASIC, FPGA, or CPLD). The processing circuitry 31 can be configured to run one or more computer program(s) or software (SW) (see also software 34 of FIG. 4) stored in a storage 32 that may include one or more storage unit(s) (e.g., a memory). The storage units can be regarded as a computer readable medium 42 (see FIG. 4) as discussed herein and may, for example, be in the form of RAM, flash memory, solid-state memory, a hard disk, or combinations thereof. The storage can include a non-transitory computer readable medium. The processing circuitry 31 can also be configured to store data in the storage 32, as needed. The code generator 13 can also include a communication interface 33 for communication within the communication network system 11, for example with the SP 15 (e.g., such as with the server 19 thereof or with the object 14 which may or may not be part of the code generator 13).

In an example, the storage 32 includes instructions that, when executed by the processing circuitry 31, cause the generator 3 to create a contrast barcode decodable using one or more techniques disclosed herein. In an example, the instructions can cause the processing circuitry to obtain an object and data to embed within the object. The instructions can also cause the processor to generate an error-corrected code of said data. The instructions can also cause the processor to determine the number of bits to embed on axes on an object. The instructions can also cause the processor to determine a graphical representation of each bit to embed as a block. The instructions can also cause the processor to generate a barcode for each axis. The instructions can also cause the processor to embed each barcode onto an object's edges. The code generator 13 may thus be arranged to perform embodiments of the method for generating a code in accordance with the present disclosure.

Figure 4:
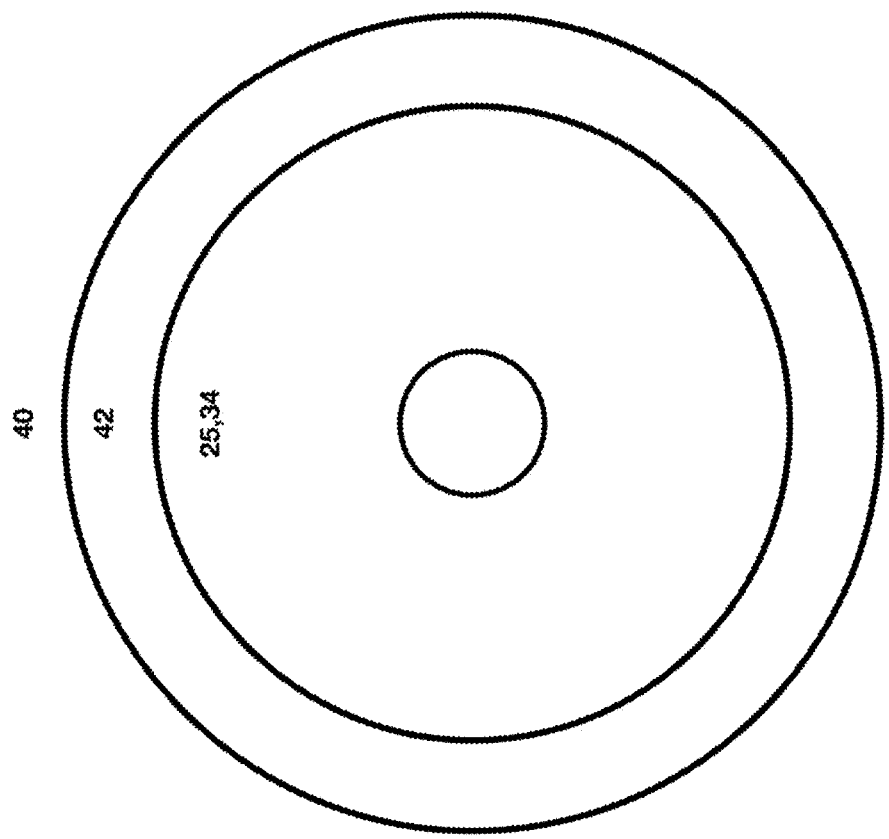
FIG. 4 illustrates a schematic illustration of an example computer program product, according to an embodiment of the present invention.

FIG. 4 illustrates a schematic illustration of an example computer program product, according to an embodiment of the present invention. FIG. 4 illustrates an example embodiment of a computer program product 40. The computer program product 40 includes a computer readable (e.g. non-volatile and/or non-transitory) medium 42 having software/computer program 25 and/or 34 in the form of computer-executable components. The computer program 25/34 can be configured to cause an image capture device 12 or code generator 13 (e.g., as discussed herein) to perform an embodiment of a method of the present disclosure. The computer program may be run on the processing circuitry 21/31 of the image capture device 12 or code generator 13 to cause it to perform the method. The computer program product 40 may, for example, be included in a storage unit or memory 22/32 of the image capture device 12 or code generator 13 and may be associated with the processing circuitry 21/31. Alternatively, the computer program product 40 may be, or be a part of, a separate (e.g., mobile) storage medium, such as a computer readable disc (e.g., a CD or DVD), a hard disc, a hard drive, or a solid-state storage medium (e.g., a RAM or flash memory). Embodiments of the present disclosure can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 5:
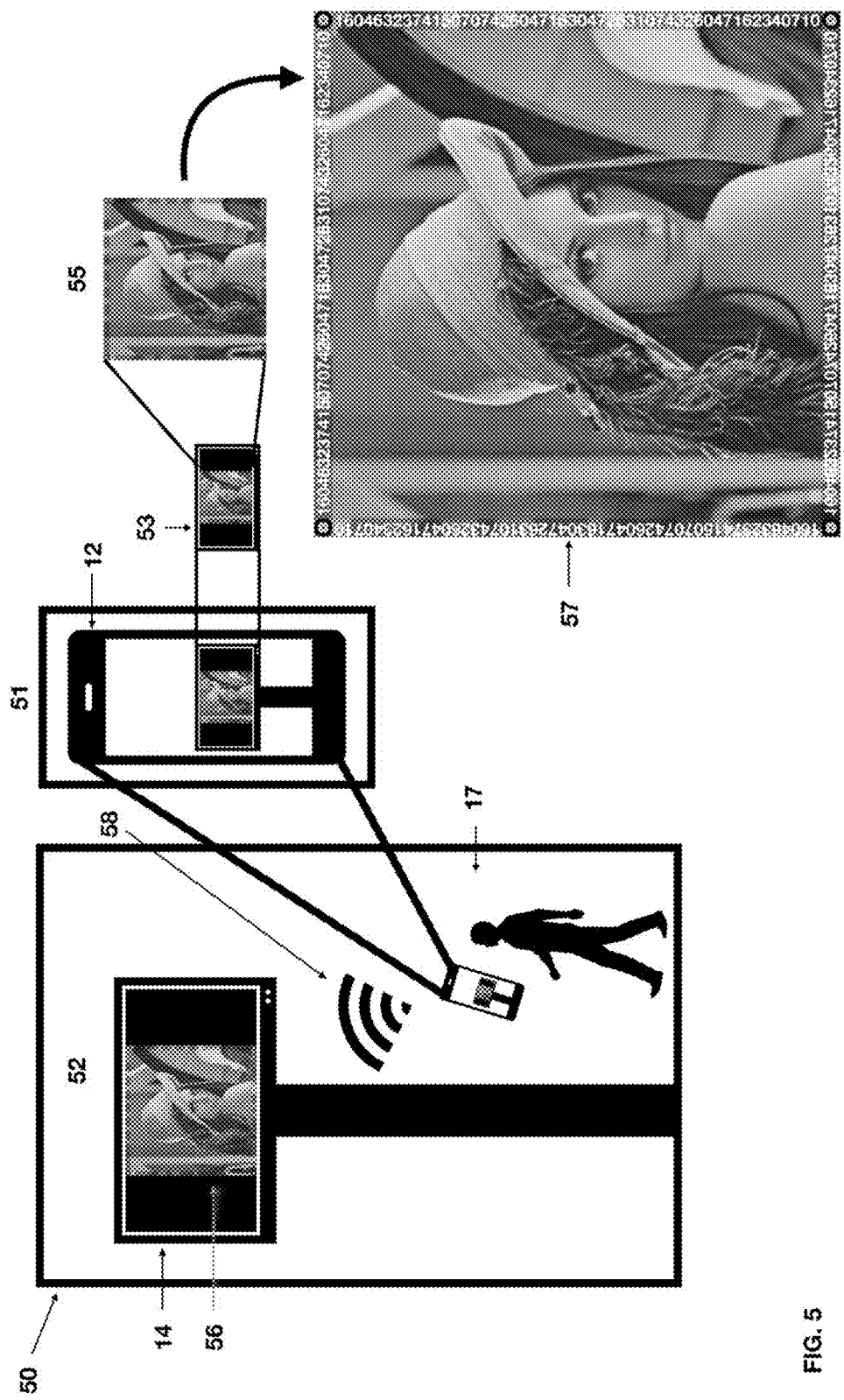
FIG. 5 illustrates a flow diagram illustrating an example method for detecting and decoding a contrast barcode, according to an embodiment of the present invention.

FIG. 5 illustrates a flow diagram illustrating an example method for detecting and decoding a contrast barcode, according to an embodiment of the present invention. FIG. 5 contains a diagram 50 illustrating an example of detecting and decoding the contrast barcode. The contrast barcode may be detected with document detection technology by finding the corners and edges of the barcode. Additional details and alternative implementations are discussed in connection with the figures to follow. In the diagram 50, a scene 52 illustrates an object 14 that includes a contrast barcode 56 and a user 17. It will be appreciated that the contrast barcode 56 can be displayed in a variety of manners such as on a user device display, a computer display, woven or otherwise affixed to an article of clothing or another product, or included in a variety of printed items. It will also be appreciated that the object 14 may display multiple contrast barcodes 56 as a sequence comprising a plurality of objects, wherein the object is one of the plurality of objects, with the sequence comprising at least one of a video, animation, lenticular print, or hologram. Callout 51 portrays an enlarged view of a portion of the scene 52. The callout 51 includes an image capture device 12 (FIG. 2) of the user 17 that includes an optical sensor (e.g., a camera sensor of a smartphone) operable to detect an optical signal 58 of the contrast barcode 56.

In an example embodiment, the image capture device 12 captures an image of the object 14 that includes the contrast barcode 56. The processor 31 receives the image data representing the image from the image capture device 12. In this example embodiment, the processor 31 is included in the image capture device 12 (e.g., an application executing on a smart phone of the user 17), although in other embodiments, the processor 31 can reside on a Packet Data Network (PDN) 16 that is communicatively coupled with the image capture device 12. Callout 53 portrays example image processing the processor 31 performs to detect and decode the contrast barcode 56 in the image. In the callout 53, the processor 31 performs object detection, edge detection, and corner detection to extract the contrast barcode 56 from the image data of the image. Subsequently, the processor 31 determines if the candidate features meet certain rules and criteria to filter out irrelevant object detection matches, shape dimensions, or other shape features that have a low probability of being the contrast barcode 56. The processor 31 detects the contrast barcode 56 based on matches between the optical markers at the corners of the contrast barcode 56, as well as matches between the edges of the contrast barcode 56 and a reference shape (e.g., a rectangle).

Subsequent to the processor 31 detecting the contrast barcode 56, the processor 31 can use edge detection with perspective transformation as an alignment pattern for decoding. For instance, the processor 31 extracts spatial attributes of the edges of the contrast barcode 56, along with optical markers at the corners of the contrast barcode 56, and compares the extracted spatial attributes to reference spatial attributes to determine an alignment of the contrast barcode 56. The processor 31 may then generate a transformed image of the image according to the alignment (e.g., a rotation or de-skew) using image transformation algorithms (e.g., four-point transforms) in an image processing library such as OpenCV, as shown in callout 55.

After generating the transformed image, the processor 31 decodes the data embedded in a portion of the transformed image as shown in callout 57. In this example embodiment, the contrast barcode was originally encoded by being split into blocks that mirror the colors of the object 14 and subsequently tinted with red, green, and blue values according to the binary data embedded. Binary data of 110 may be encoded with a red tint of 1, green tint of 1, and blue tint of 0, with 0 corresponding to darkening and 1 corresponding to brightening. For example, if the adjacent block in the object 14 has median red, green, and blue values of 64, 128, and 192, the mirrored and tinted block in the edge may have median red, green, and blue values of 192, 256, and 64, respectively. In the callout 57, the contrast barcode 56 is illustrated with decimal representations of the encoded binary data (e.g., binary data of 110 is represented as 6), although this is merely an illustrative example, and other bit encoding schemes can be employed. In some embodiments, the bits are converted into a different representation, encoding, or format for use. For instance, the bits can be converted into or otherwise treated as characters, a number, or other kinds of content.

Figure 6:
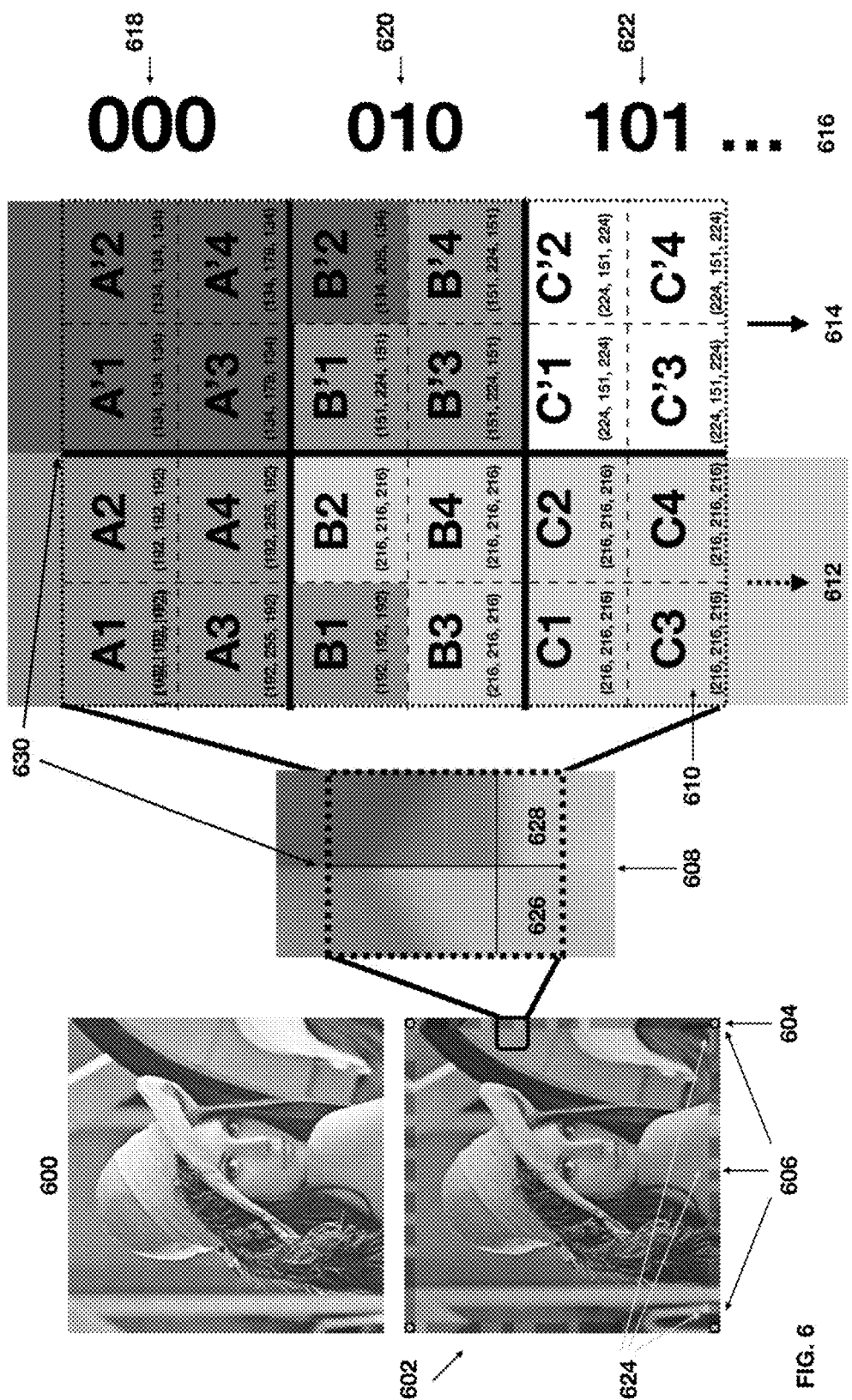
FIG. 6 illustrates a diagram depicting an example of encoding a contrast barcode with an antecedent object, according to an embodiment of the present invention.

FIG. 6 illustrates a diagram depicting an example of encoding a contrast barcode with an antecedent object, according to an embodiment of the present invention. FIG. 6 is a diagram illustrating an example object 600 (e.g., a digital image of a woman) embedded with a binary code that contains a binary sequence 616 (i.e., 21 or 0b000010101) with method 800 to create a contrast barcode 602. In an example embodiment, the contrast barcode 602 may include the object 600, optical markers 604, and contrast barcode markings 606. The optical marker 604 may be a logo or other distinctive marker that may be recognized using a sensor with technology such as object detection or depth sensing. It will be appreciated that the optical marker 604 is merely an example optical marker, and other graphics, icons, symbols, or physical objects can be employed as markers using the techniques described herein. Other example contrast barcodes can include designs with multiple paths, multiple polygons, multiple aesthetic elements, or other design features. In some embodiments, a contrast barcode may not include any objects or optical markers.

As seen in the contrast barcode 602, the markings 606 are blocks that are arranged in a pattern with a particular spacing or positioning readable by a machine. Although the contrast barcode 602 includes markings 606 as blocks, other shapes and marks can be employed (e.g., dots or asymmetric shapes of various geometries). The markings 606 can be arranged in a uniform pattern or a non-uniform pattern. In some instances, the marks can be of different sizes or a uniform size. Additionally, the markings 606 can be in a predetermined arrangement or an arrangement that is dynamically determinable when decoding data from the markings. One or more markings 606 can be embedded within or outside the object 600. In various embodiments, the optical marker 604 and the markings 606 can be arranged in a continuous sequence, such as in the contrast barcode 602.

Although the object 600 and the contrast barcode 602 are shown as rectangles, the object 600 and the contrast barcode 602 can be in the form of a variety of other shapes with various geometries and dimensions. Further details of FIG. 6 will be described in conjunction with method 800 in FIG. 8.

Figure 7:
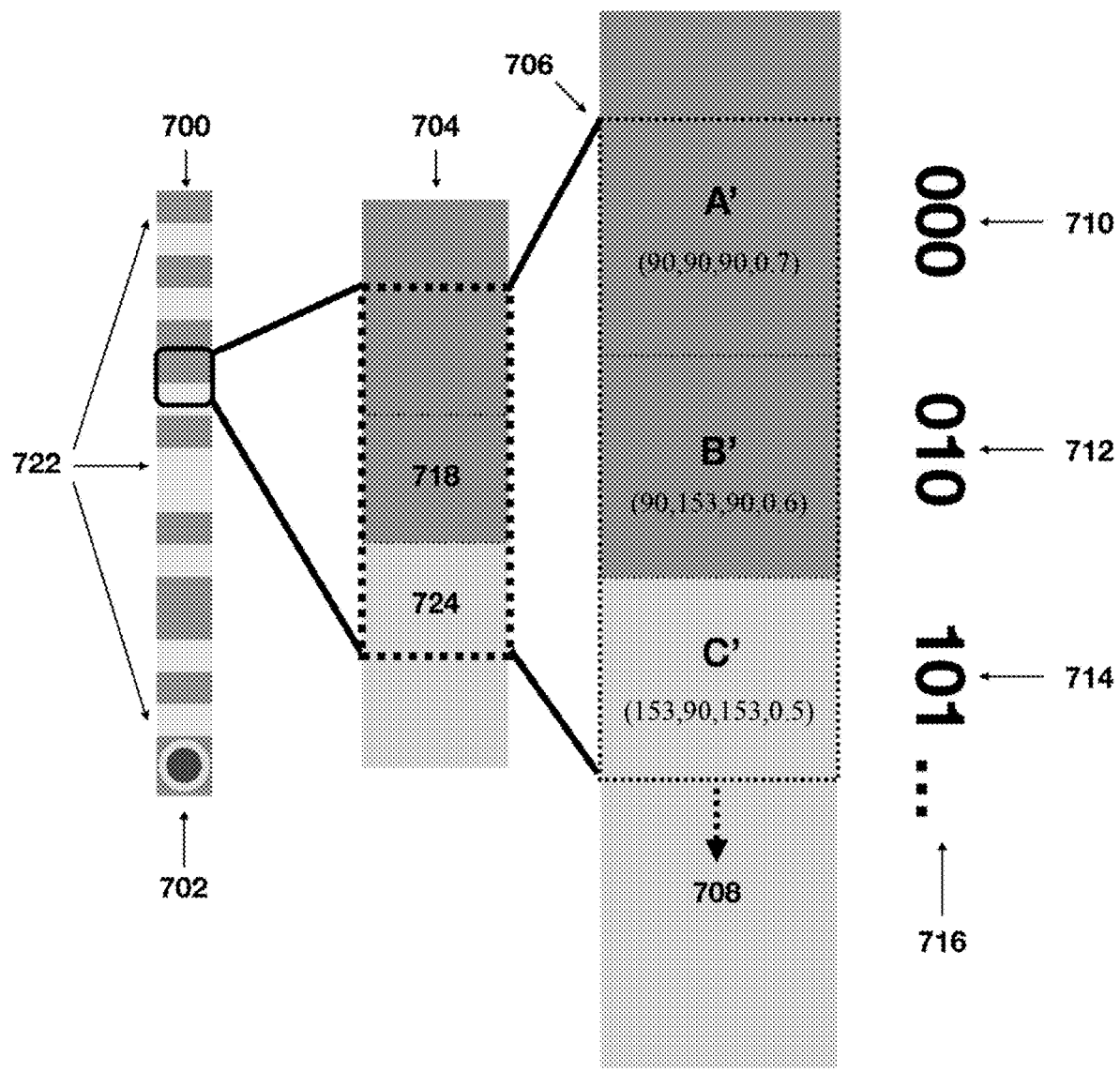
FIG. 7 illustrates a diagram depicting an example of encoding a contrast barcode without an antecedent object, according to an embodiment of the present invention.

FIG. 7 illustrates a diagram depicting an example of encoding a contrast barcode without an antecedent object, according to an embodiment of the present invention. FIG. 7 is a diagram illustrating an example portable contrast barcode 700 generated with system 800. The contrast barcode 700 may include contrast barcode markings 722 and an optical marker 702. It will be appreciated that the optical marker 702 is merely an example optical marker, and other graphics, icons, or symbols can be employed as a finder pattern or alignment pattern using the techniques described herein. Other example optical markers used as a functional pattern can include designs with multiple paths, multiple polygons, multiple aesthetic elements, or other design features.

As shown in the contrast barcode 700, the markings 722 are blocks that are arranged in a pattern with a particular spacing or positioning readable by a machine. Although the contrast barcode 700 shows the markings 722 as blocks, other shapes and marks can be employed (e.g., dots or asymmetric shapes of various geometries). The markings 722 can be arranged in a uniform pattern or a non-uniform pattern. In some instances, the marks can be of different sizes or a uniform size. Additionally, the markings 722 can be in a predetermined arrangement or an arrangement that is dynamically determinable when decoding data from the markings. In some embodiments, the optical marker 702 and the markings 722 can be arranged in a continuous sequence, such as in the contrast barcode 700. Although the contrast barcode 700 is shown as a rectangle, the contrast barcode 700 can be in the form of a variety of other shapes with various geometries and dimensions. It will be appreciated that while one sequence of markings 722 (comprising one axis) and one optical marker 702 is shown in the contrast barcode 700, contrast barcodes may comprise multiple axes and multiple optical markers.

In an example embodiment, the contrast barcode 700 may represent a physical transparent object (e.g., a sticker), and the processor 31 (FIG. 5) may determine the colors of markings 722 to print onto the contrast barcode 700. The markings 722 may be arranged sequentially, beginning at an optical marker 702. Further details of FIG. 7 will be described in conjunction with method 800 in FIG. 8.

Figure 8:
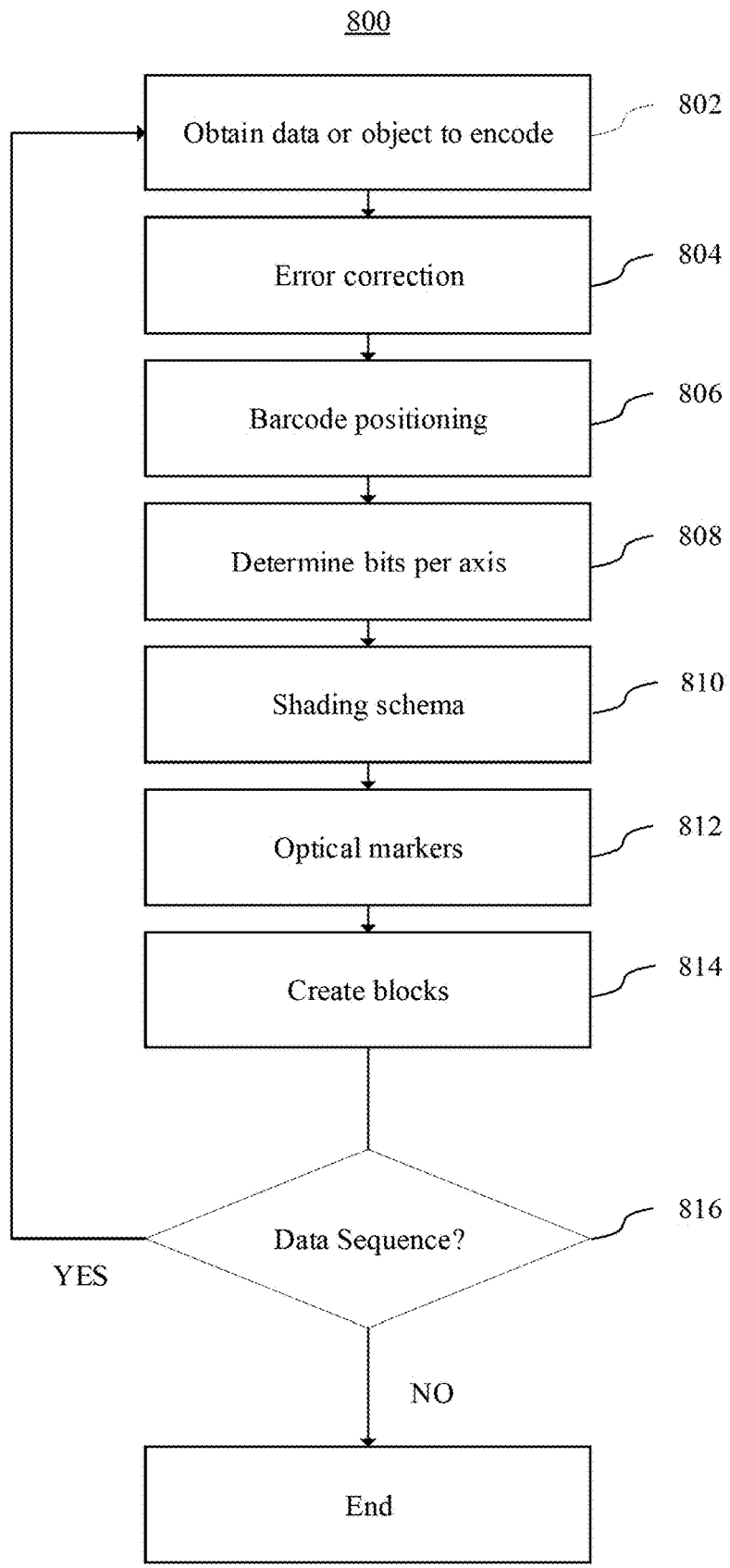
FIG. 8 illustrates a flow diagram illustrating an example method for encoding a contrast barcode, according to an embodiment of the present invention.

FIG. 8 illustrates a flow diagram illustrating an example method for encoding a contrast barcode, according to an embodiment of the present invention. FIG. 8 illustrates an example method 800 for embedding a contrast barcode. The method 800 will be described in relation to the contrast barcode 602 in FIG. 6, but need not be so limited. The operations of method 800 can be performed by components of the code generator 13, and are so described below for the purposes of illustration. The method 800 begins with operation 802, which involves obtaining a code or object for encoding.

At operation 802, a code (e.g., a binary code) for encoding is received. In some embodiments, an object to be encoded (e.g., a digital image) is received as well. Turning to FIG. 6 for an example embodiment, a code 616 may be a binary code, and an object 600 may be a digital image. It will be appreciated that the binary code 616 is merely an example code, and other representations, encodings, or formats may be used. For instance, the code can be converted into or otherwise treated as characters, a number, or other kinds of content. It will also be appreciated that the object 600 (a digital image) is merely an example object, and objects with other properties or dimensions may be used.

For instance, an object may be, but need not be limited to, a digital video, a physical object such as a bottle, or a printed image. Turning now to FIG. 7 for another example embodiment, a code 716 (i.e., 21 or 0b000010101) may be a binary code provided for encoding. In this example, an object is not provided for encoding; rather a portable and transparent contrast barcode 700 is created for embedding onto an object at a later time. The portable barcode may be digital or physical, two or three-dimensional, linear or nonlinear, and consist of one or more axes and zero or more optical markers.

At operation 804, the code is converted to a binary code, and error correction or detection is added to the binary code. In some embodiments, a binary code is encoded with the Reed-Solomon Error Correction algorithm. Reed-Solomon error correction is an error-correcting code. It works by oversampling a polynomial constructed from the data. The polynomial is evaluated at several points, and these values are sent or recorded.

Sampling the polynomial more often than is necessary makes the polynomial over-determined. As long as it receives a certain number of the points correctly, the original polynomial can be recovered even in the presence of a few incorrect points.

Reed-Solomon codes are examples of error correcting codes, in which redundant information is added to data so that it can be recovered reliably despite errors in transmission or storage and retrieval. In a simple example, a message that includes a single character a is encoded three times as aaa. If one of the characters is decoded or stored incorrectly (e.g., the message reads baa, aba, or aab) the correct character "a" can still be recovered by taking a majority vote. However, the above technique may be inefficient because it requires three times the number of characters in the message to be stored. In some cases, a strategy for decoding any error correcting code is, if we receive a word B that is not a codeword, to find the codeword A that is "closest" to B. and then decode A to get the message. The "closest" codeword to B may be the codeword with the lowest Hamming distance from B, where the Hamming distance from B to A is the number of bits in B that are to be changed to get A.

At operation 806, the positioning and axes of a contrast barcode are determined. In some embodiments, a user may dictate that contrast barcode markings be positioned within an object (e.g., the contrast barcode markings visible in 1002 in FIG. 10a). In this example, contrast barcode markings may overlap an object (e.g., the encoding axis 1018 in FIG. 10a), and reference axes may lie parallel to the inner edges of the contrast barcode (e.g., the reference axis 1020 in FIG. 10a). Techniques related to encoding transparent contrast barcodes (described herein in relation to a transparent barcode 700 in FIG. 7) may be used to encode contrast barcode markings that overlap objects, as will be apparent to those skilled in the software art.

Sans user input, contrast barcode markings may be positioned at the outer sides of an object, with each side embedding a subsection of the contrast barcode markings (with each subsection herein called a "sectional barcode") and virtual reference axes parallel to the inner edges of the markings. Turning now to FIG. 10*b* as an example embodiment, an object may be a circle (e.g., the circle captured in image 1006). In this example, contrast barcode markings 1008 may be embedded outside the object as a ring, without obscuring the object itself, and a reference axis 1024 may be a concentric ring within the circular object.

Turning now to FIG. 10*c* as another example embodiment, a three-dimensional object may be provided for encoding (e.g., a sphere, as captured in the image 1010). In this example, contrast barcode markings may be positioned within a surface on an object that enables an image capture device 12 (FIG. 2) to capture the entire barcode with a single image from a single direction at a plurality of distances. In this example, a spherical cap area can be calculated by the Gauss-Bonnet theorem to be approximately one-third of the surface of a sphere, and the markings are embedded to cover one-third or less of the sphere. In some embodiments, optical markers may be placed within the contrast barcode to help define encoding and reference axes. For example, the three optical markers in the contrast barcode in image 1010 in FIG. 10*c* indicate that there exists one elliptical encoding axis intersecting the markers (e.g., the encoding axis 1026 in FIG. 10*c*), and there exists a concentric reference axis 1028. Turning now to FIG. 6 as another example embodiment, the four optical markers 604 in contrast barcode 602 indicate that there exists four encoding axes between the markers, and that there exists four reference axes parallel to the encoding axes.

Turning now to FIG. 7 as further example embodiment, no object is provided, so a portable contrast barcode (e.g., the contrast barcode 700) is created for embedding onto an object at a later time. In this example, the portable contrast barcode is later embedded onto an object (e.g., the contrast barcode captured in image 1014 in FIG. 10*d*), and the shape and optical markers may indicate a linear encoding axis 1032 beginning at a marker 1038, with a parallel reference axis 1030 immediately to the left of the contrast barcode.

In various embodiments, the styles, sizes, or placement of optical markers help define encoding and reference axes (e.g., two large red optical markers may indicate cross-shaped encoding and reference axes), and the rules relating optical markers with encoding algorithms may be readily established by skilled programmers. In some embodiments, encoding axes are identical to decoding axes, and the rules may be sent to a processor 31 (FIG. 5) via a PDN 16 (FIG. 1) to assist with decoding.

At operation 808, the number of bits to encode per encoding axis is determined.

Turning to FIG. 6 as an example embodiment, the object 600 may be a digital image, and the processor 31 may need to digitally embed the contrast barcode markings onto the edge of image 600. In this embodiment, the sectional barcode 606 is labeled as one of the four sectional barcodes that may be arranged sequentially clockwise around the image 600.

The first sectional barcode may be placed at the top of the image 600, the second sectional barcode at the right of image 600, etc., for a total of four sectional barcodes that compose a single contrast barcode marking.

Each sectional barcode may encode a partial non-overlapping subsequence of binary data. In one embodiment, for binary data of length n, the number of bits x encoded for the sectional barcodes at the left and right sides of the image 600 may be determined with the formula $x=(n/2+1)*(\text{width}/(\text{width}+\text{height}))$ where width and height correspond to the dimensions of image 600. Similarly, the number of bits x encoded for the sectional barcodes at the top and bottom sides of the image 600 may be determined with the formula $x=(n/2+1)*(\text{height}/(\text{width}+\text{height}))$. The first x bits of the binary data may be encoded into the top sectional barcode, the next x bits may be encoded into the right sectional barcode, and so on.

At operation 810, the shading schema of the contrast barcode is determined. Turning to FIG. 6 for example embodiments, every three bits of binary data may correspond to a single color tint for each new marking block within the contrast barcode. In one embodiment, for every three bits, the first bit corresponds to a darkening or brightening of red, the second bit corresponds to a darkening or brightening of green, and the third bit corresponds to a darkening or brightening of blue. For each color, the bit 0 corresponds to a darkening of a reference block, while the bit 1 corresponds to a brightening of the reference block. As shown in the callout 608, a new marking block 628 may encode the bits 101 by first mirroring each pixel in reference block 626 across edge axis 630, then tinting each pixel (e.g., by brightening red, darkening green, and brightening blue). In another embodiment, every bit of binary data corresponds to a darker or lighter tint for one marking block within markings 606. In this embodiment, the bit 0 corresponds to a darkening of a reference block and the bit 1 corresponds to a brightening of a reference block. As shown in the callout 608, the marking block 628 may encode the bit 0 by mirroring and brightening reference block 626.

Now turning to FIG. 7 for example embodiments, a shading schema for a portable contrast barcode may be created even without an object. In one embodiment, every bit of binary data to encode may correspond to a transparent darker or lighter tint for one new marking block within contrast barcode 700. In this embodiment, the bit 0 corresponds to a darker or opaquer block such as block 718, and the bit 1 corresponds to a brighter or more transparent block such as block 724. In another embodiment, every three bits of binary data may correspond to a transparent color tint for each block within the contrast barcode 700. In this embodiment, the first bit may correspond to a darkening or brightening of red, the second bit to a darkening or brightening of green, and the third bit to a darkening or brightening of blue. In this embodiment, for each color, the bit 0 may correspond to a darker or opaquer block, and the bit 1 may correspond to a brighter or more transparent block. In an example, the marking block 718 (i.e., block B') may encode the bits 010 by darkening the red, brightening the green, and darkening the blue colors of an object behind it. In these embodiments, a shading schema for a portable contrast barcode may be created without an object, and the contrast barcode may still later be applied to an object and decoded.

At operation 812, optical markers, which may be utilized by an image capture device 12 to detect a contrast barcode, are placed on a contrast barcode or an object. In some embodiments, the axes of a contrast barcode (as determined at operation 806) determine the placement of optical markers. For example, a singular circular axis may result in three equidistant optical markers along the contrast barcode (e.g., contrast barcode 1010 in FIG. 10c), four linear axes comprising a rectangle may result in four optical markers being placed at the intersection of the axes (e.g., optical markers 604 in FIG. 6), and one linear axis may result in one optical marker being placed at one end of the axis (e.g., optical marker 702 in FIG. 7). In other embodiments, the shape of an object determines the placement of optical markers. In yet another embodiment, no optical markers are placed because other visual features of a contrast barcode may be utilized for detection purposes (e.g., edges of a contrast barcode may be detected with Canny edge detection). The rules relating axes, shapes, or edges to optical markers for encoding may be readily established by skilled programmers. In some embodiments, encoding axes are identical to decoding axes, and the rules may be sent to a processor 31 (FIG. 5) via a PDN 16 (FIG. 1) to assist with decoding.

At operation 814, a contrast barcode is created. Turning now to FIG. 6 as an example embodiment, the darkening of marking blocks may be performed by utilizing the following formula for each pixel within the new marking block: $x0=color*(1-c0)$ where a color is either an average red, green, and blue values (the red, green, and blue values that compose a pixel are herein called a "RGB value") or an individual RGB value between 0 and 255 inclusive, and c0 is a constant that determines the degree of darkness for the tint. Similarly, brightening of blocks may be performed by utilizing the following formula for each pixel within the new marking block: $x1=color+((255-color)*c1)$ where color is either an average RGB value or individual RGB value between 0 and 255 inclusive, and c1 is a constant that determines the degree of brightness for the tint.

The constants c0 and c1 provide flexibility in color contrast and balance of contrast barcodes, and may be modified in various embodiments to create a transparent or camouflage effect, higher contrast, or specific colors that convey (in its visual appearance) a consistent theme (e.g., a branding identity or a Christmas theme). In these examples, c0 is 0.3 and c1 is 0.2, which results in a transparent or camouflage effect for the contrast barcode.

For a given sectional barcode axis of length x0, aggregate contrast barcode length (i.e., the sum of all sectional barcode axes lengths) xt, and binary data of length nt, the number of bits n0 encoded per axis may be proportional to the axis length, given by $n0=(x0/xt)*nt$. The number of blocks b0 in each sectional barcode may be calculated by dividing the number of bits n0 encoded per axis by the number of bits encoded per marking block. In some embodiments, three bits are encoded per marking block (e.g., by tinting RGB values), and $b0=n0/3$. In other embodiments, one bit is encoded per marking block (e.g., by darkening or brightening all RGB values), and $b0=n0$. The width of each block in a sectional barcode may be determined by the formula $w=length/b0$ where length is the length of the sectional barcode and b0 is the number of blocks in the sectional barcode. The height of each block in a sectional barcode may be determined by $h=(width+height)/((nt/2)+1)$ where width and height correspond to object dimensions, and nt is the total length of the binary data. The placement of each marking block may be continuous and sequential along an encoding axis. For example, the marking blocks for the sectional barcode 606 may be placed from right to left starting at optical marker 604, and the marking blocks for subsequent sectional barcodes may continue to be embedded in a clockwise fashion around the image 600.

It will be appreciated that an object 600 and contrast barcodes can be presented in a variety of manners such as on a user device display, a computer display, woven or otherwise affixed to an article of clothing or another product, or included in a variety of printed items. It will also be appreciated that the RGB color model used is merely an example color model, and one or more bits may be encoded using other color models such as CMYK, HSL, or HSV. It will further be appreciated that although the contrast barcode 602 is shown as a digital two-dimensional rectangle, the contrast barcode markings can be applied to any linear or nonlinear edge on any digital or physical, two or three-dimensional objects. By selecting consistent and sequential new and reference axes, appropriate software coding can readily be prepared by skilled programmers to embed contrast barcodes based on the teachings of the present disclosure, as will be apparent to those skilled in the software art.

Callout 608 shows an enlarged portion of a sectional barcode that includes three reference blocks and three new marking blocks, with reference block 626 and new marking block 628 forming a pair. A pair herein refers to two blocks that encode data by containing colors that may be related by reflection, tint, or contrast in encoding or decoding methods. New marking blocks may be placed adjacent to their reference block, perpendicular to edge axis 630 at the edge of a sectional barcode. Callout 610 shows an enlarged portion of callout 608 indicating the colors of the individual pixels within the blocks. Each reference block A, B, and C contains four pixels A1, A2, A3, and A4; B1, B2, B3, and B4; and so on, respectively. Similarly, each new marking block A', B', and C' contains four pixels A'1, A'2, A'3, and A'4; B'1, B'2, B'3, and B'4; and so on, respectively. Each pixel is labeled with its RGB values in parentheses. For example, pixel A3 has a red value of 192, green value of 255, and blue value of 192. The binary code 616 (i.e., 21 or 0b000010101) is encoded into the contrast barcode 602 three bits at a time, starting with bits 618 (i.e., 0 or 0b000), followed by bits 620 (i.e., 2 or 0b010) and bits 622 (i.e., 5 or 0b101).

In an example embodiment, the new marking block A' is first created by mirroring the pixels of reference block A across edge axis 630 at the edge of a sectional barcode. For example, pixel A'1 is originally the same color as pixel A2, pixel A'2 is originally the same color as pixel A1, pixel A'3 is originally the same color as pixel A4, etc. Then, each pixel may be tinted according to the bit code to encode. Bits 618 (i.e., 0 or 0b000) indicate a darkening of red, green, and blue values for all pixels in A' since the bit code is 000.

Hence the pixel A'1, which originally had an RGB value of (192, 192, 192) matching pixel A2, undergoes a darkening of red, green, and blue values to (134, 134, 134). In another example, the pixel B'2 is originally a reflection of pixel B1 with an RGB value (192, 192, 192), but then tinted with bits 620 (i.e., 2 or 00b010), indicating an encoding of 010. The first bit 0 represents a darkening of red, the second bit 1 represents a brightening of green, and the last bit 0 represents a darkening of blue, resulting in the pixel B'2 with colors (134, 205, 134). Subsequent blocks may be embedded along the encoding axis 614, which may be parallel to edge axis 630 and adjacent to reference axis 612. Once all the pixels in blocks A', B', and C' are tinted, the binary code 616 (i.e., 21 or 0b000010101) is effectively embedded amidst the object 600, and encoding may continue on the current sectional barcode and any subsequent sectional barcodes.

It will be appreciated that the binary code can contain any number of bits, and that the reference and marking blocks can contain any number of pixels. It will also be appreciated that although the callout 610 shows the blocks as rectangles, other shapes and marks can be employed (e.g., dots or asymmetric shapes of various geometries). The blocks can be arranged in a uniform pattern or a non-uniform pattern.

In some instances, the marks can be of different sizes or a uniform size. It will be appreciated that although new marking blocks in callout 610 are originally mirrored and reflected pixels of its reference block, other image processing techniques can be employed to create new marking blocks (e.g., shifting the reference block, rotating the reference block, applying a blur to the reference block, any combination of these, etc.).

Now turning to FIG. 7 as an example embodiment of transparent contrast barcodes, the darkening of marking blocks may be performed by utilizing the following formula for each new marking block: $x0=color*(1-c0)$ where color is a constant that determines the baseline color, and c0 is a constant that determines the degree of darkness for the tint. In this example, color is 128 and c0 is 0.3. Similarly, brightening of blocks may be performed by utilizing the following formula for each pixel within the new marking block: $x1=color+((255-color)*c1)$ where color is a constant that determines the baseline color, and c1 is a constant that determines the degree of brightness for the tint. In this example, color is 128 and c1 is 0.2. The alpha value, which determines the degree of opaqueness, may be calculated as $1-(r+g+b)/(256*3)$, where r is tinted red value, g is the tinted green value, and b is the tinted blue value.

It will be appreciated that the object 700 and the markings 722 can be presented in a variety of manners such as on a user device display, a computer display, woven or otherwise affixed to an article of clothing or another product, or included in a variety of printed items. It will also be appreciated that although the contrast barcode 700 is shown as a digital two-dimensional rectangle, markings 722 can be applied to any linear or nonlinear, digital or physical, two or three-dimensional surface. By selecting consistent block and optical marker shapes and sizes, appropriate software coding can readily be prepared by skilled programmers based on the teachings of the present disclosure, as will be apparent to those skilled in the software art.

Callout 704 shows an enlarged portion of a markings 722 that includes three encoded blocks, with blocks 718 and 724 labeled as thus. New marking blocks may be placed parallel to the encoding axis 708 and perpendicular to optical marker 702. Callout 706 shows an enlarged portion of callout 704 indicating the colors and alpha value of the individual pixels within the blocks. Each block A', B', and C' is labeled with its red, green, blue, and alpha values in parentheses. For example, B' has a red value of 90, green value of 153, blue value of 90, and alpha value of 0.6. Each block may comprise multiple pixels with similar tints. In this example embodiment, the binary code 716 (i.e., 21 or 0b000010101) is encoded into the contrast barcode 700 three bits at a time, starting with bits 710 (i.e., 0 or 0b000), followed by bits 712 (i.e., 2 or 0b010), then bits 714 (i.e., 5 or 0b101).

In this example embodiment, the pixels in the new marking block A' may be initialized with RGB values of (128, 128, 128). Then, each block may be tinted according to the bit code to encode. Bits 710 (i.e., 0 or 0b000) indicate a darkening of red, green, and blue values for A' since the bit code is 000. Hence pixels in A', which was originally (128, 128, 128), is tinted to (90, 90, 90, 0.7). The alpha value is calculated as $1-(90+90+90)/(256*3)=0.7$. In another example, B' is originally (128, 128, 128), then tinted with bits 712 (i.e., 2 or 0b010), indicating a code of 010. The first bit 0 represents a darkening of red, the second bit 1 represents a brightening of green, and the last bit 0 represents a darkening of blue, resulting in block B' with colors (90, 153, 90). The alpha value is calculated as $1-(90+153+90)/(256*3)=0.6$. Once all the pixels in blocks A', B', and C' are tinted, the binary code 616 (i.e., 21 or 0b000010101) is effectively embedded for use amidst other objects. It will also be appreciated that although the callout 704 shows the blocks as rectangles, other shapes and marks can be employed (e.g., dots or asymmetric shapes of various geometries). The blocks can be arranged in a uniform pattern or a non-uniform pattern. In some instances, the marks can be of different sizes or a uniform size.

It will also be appreciated that the specific tint values of marking blocks are provided here merely as an example. By adjusting the weights of red, green, and blue values during the darkening or brightening of blocks, appropriate software coding can readily be prepared by skilled programmers to obtain a contrast barcode with other tint balances based on the teachings of the present disclosure, as will be apparent to those skilled in the software art. For example, the constants c0 and c1 in an aforementioned example embodiment provide flexibility in color contrast and balance of contrast barcodes, and may be modified in various embodiments to create a transparent or camouflage effect, higher contrast, or specific colors that convey (in its visual appearance) a consistent theme (e.g., a branding identity or a Christmas theme).

Figure 11:
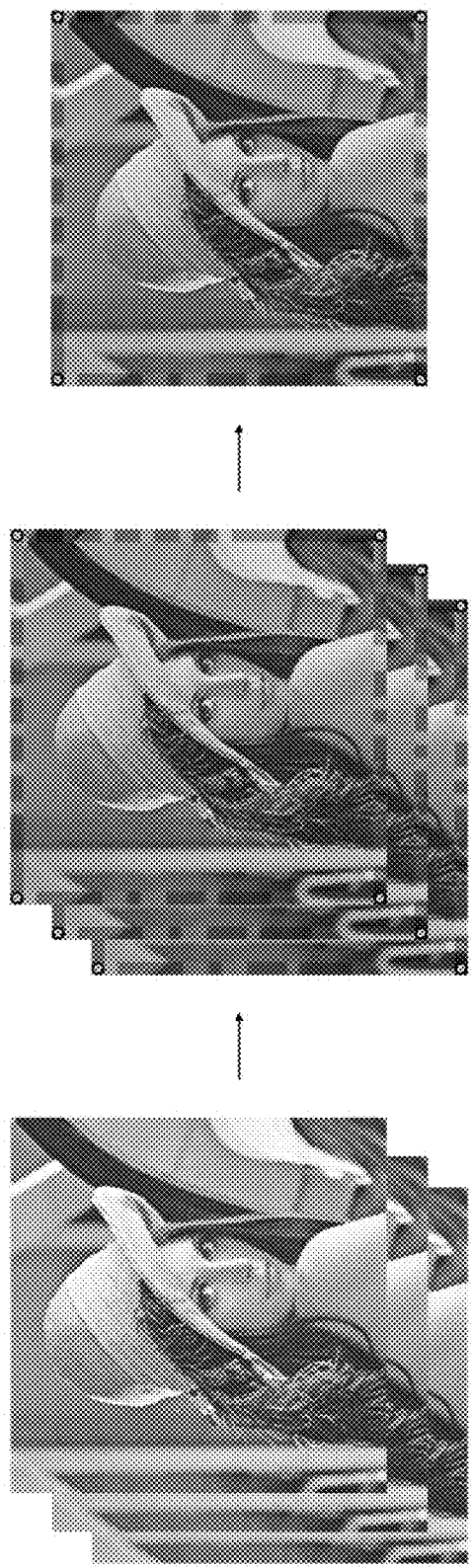
FIG. 11 illustrates examples of contrast barcode sequences, according to an embodiment of the present invention.

At operation 816, further embedding may be performed for object sequences. FIG. 11 illustrates an example of an object sequence 1100 of unencoded objects, which may compose an unencoded video, and an encoded sequence 1102 of objects, which may compose an encoded video. In various embodiments, a sequence of multiple objects (e.g., a sequence of frames in a video, or a sequence of orientations of a lenticular print) may be embedded with contrast barcodes through an encoding method. If more than one object needs encoding, the operations of method 800 may be iteratively performed for each object (e.g., each frame in a video) using the same code for each iteration. By repeating method 800 for each object in the object sequence 1100, appropriate software coding can readily be prepared by skilled programmers to obtain the encoded sequence 1102 based on the teachings of the present disclosure, as will be apparent to those skilled in the software art.

Figure 9:
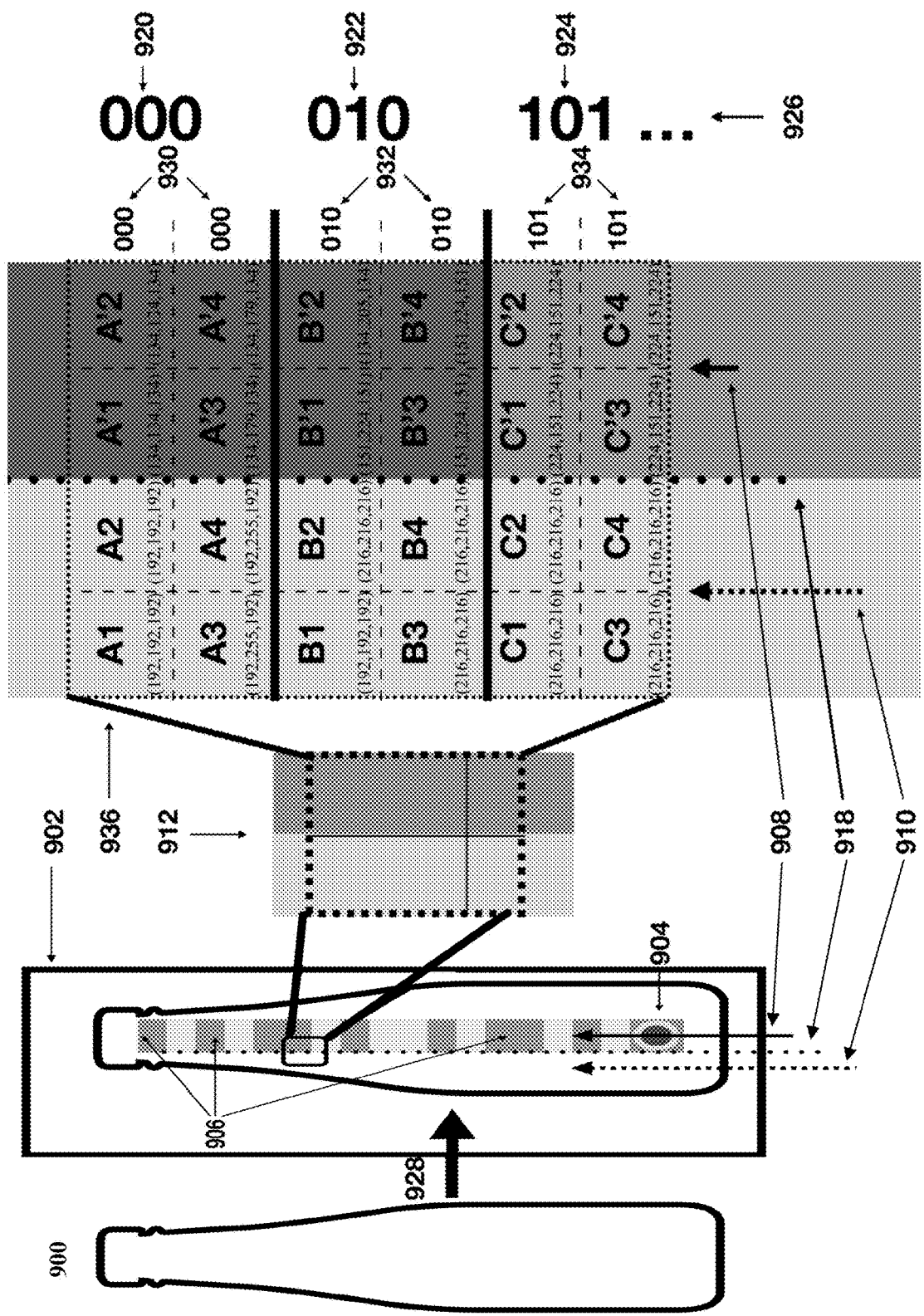
FIG. 9 illustrates a diagram depicting an example of decoding a contrast barcode, according to an embodiment of the present invention.

FIG. 9 illustrates a diagram depicting an example of decoding a contrast barcode, according to an embodiment of the present invention. FIG. 9 illustrates an example digital image 902 that includes an image of an object 900 (which may be, in this example, a glass bottle) with a portable contrast barcode 906 embedded. The contrast barcode 906 may be decoded in a variety of ways. In an example embodiment, the contrast barcode 906 may include the object 900, optical marker 904, and contrast barcode markings 906. The optical marker 904 may be a logo or other visually distinctive object that may be recognized using object detection technology. It will be appreciated that the optical marker 904 is merely an example optical marker, and other graphics, icons, symbols, or physical objects can be employed as optical markers using the techniques described herein. Other example contrast barcodes can include designs with multiple paths, multiple polygons, multiple aesthetic elements, or other design features. In some embodiments, a contrast barcode may not include any objects or optical markers.

As seen in the image 902, the markings 906 are blocks that are arranged in a pattern with a particular spacing or positioning readable by a machine. Although the image 902 includes markings 906 as blocks, other shapes and marks can be employed (e.g., dots or asymmetric shapes of various geometries). The markings 906 can be arranged in a uniform pattern or a non-uniform pattern. In some instances, the marks can be of different sizes or a uniform size. Additionally, the markings 906 can be in a predetermined arrangement or an arrangement that is dynamically determinable when decoding data from the markings. One or more markings 906 can be embedded within or outside the object 900. In various embodiments, the optical marker 904 and the markings 906 can be arranged in a continuous sequence, such as in the image 902. Further details of FIG. 9 will be described in conjunction with method 1200 in FIG. 12.

Figure 10:
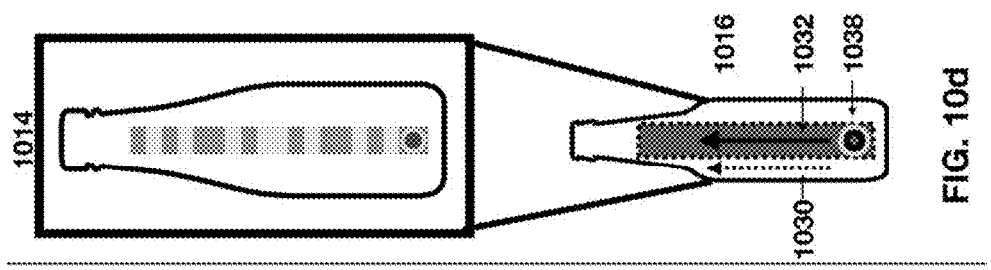
FIGS. 10A-10D illustrate example images of contrast barcodes and example decoding patterns, according to an embodiment of the present invention.
Figure 10:
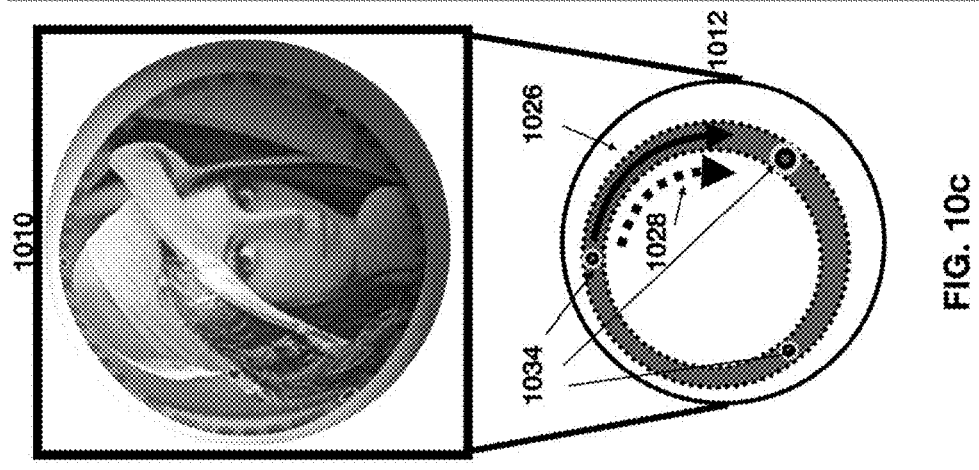
Figure 10:
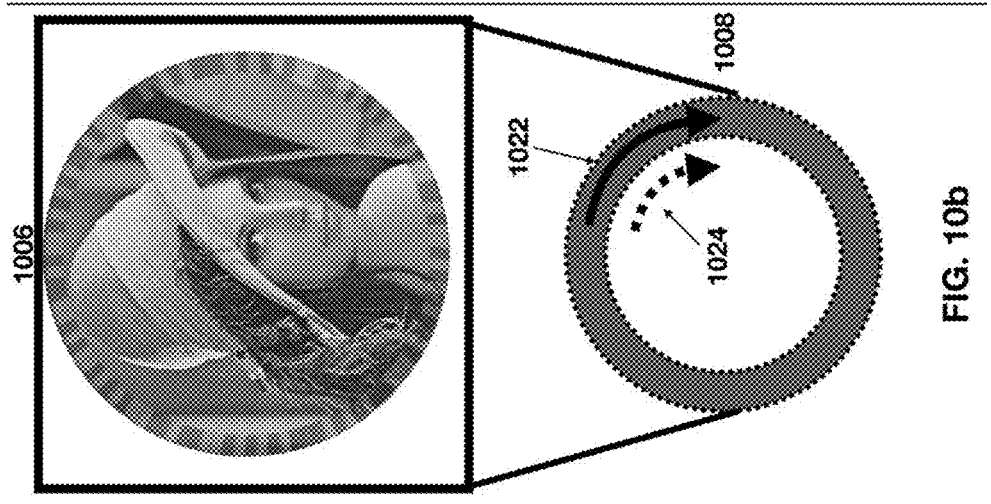
Figure 10:
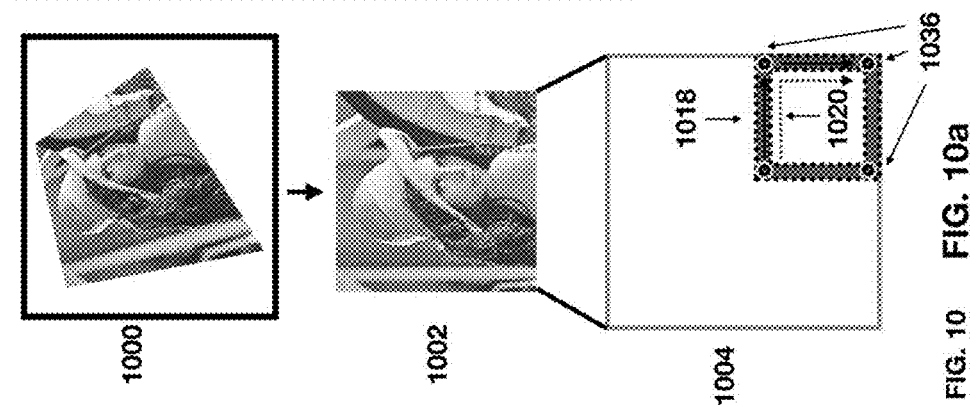

FIG. 10 illustrates example images of contrast barcodes and example decoding patterns, according to an embodiment of the present invention. FIG. 10 illustrates example images of contrast barcodes. Images of these barcodes may be skewed due to, for example, the image being taken non-orthogonally to the object in the image, or the contrast barcode being applied to uneven physical surfaces. Method 1200 (FIG. 12) details image detection and transformation methods to identify contrast barcodes within an image.

Diagrams 1004, 1008, 1012, and 1016 illustrate example extracted contrast barcodes, and example decoding patterns for these barcodes are illustrated with decoding axes, reference axes, and optical markers.

FIG. 10a illustrates a digital contrast barcode 1002 embedded within an object, at a corner. In an example, an image 1000 of contrast barcode 1002 is skewed, and corrected with quadrilateral detection and perspective transformation to recover contrast barcode 1002. In some instances, optical markers 1036 embedded within an object may be used for perspective transformation, such as by using, for example, four-point transformation algorithms from an image processing library such as OpenCV. As seen in diagram 1004, a contrast barcode may overlap an object, and reference axes 1020 may lie parallel to the inner edges of the encoding axes 1018. In an example, each edge of a contrast barcode encodes a subsequence of a binary code. In this example, method 1200 may start at an arbitrary edge, decode a binary subsequence for each edge, and permute concatenations of each subsequence until a binary code passes error detection or correction.

FIG. 10b illustrates a digital contrast barcode positioned at the outer edges of a circular image without optical markers. In an example, the contrast barcode is embedded outside of the image as a digital ring without obscuring the image itself. Image 1006 of the contrast barcode is represented in diagram 1008, where a reference axis 1024 may be a concentric ring parallel to the reference axis 1022. In some instances, contrast barcodes exist without optical markers, and a contrast barcode may be detected with edge detection techniques (e.g., Canny edge detection) or shape detection algorithms from a library such as OpenCV. In an example, a binary code is encoded in a single continuous sequence. In this example, method 1200 may start at an arbitrary point in a contrast barcode and decode a sequence to a binary code, then perform an exhaustive bitwise right rotation of the binary code until the binary code passes error detection or correction.

FIG. 10c illustrates a physical contrast barcode on a three-dimensional object such as a sphere. In an example, a two-dimensional physical printing of the digital image 1006 may be embedded onto a physical sphere such that the printing is positioned to enable an image capture device 12 (FIG. 2) to capture the entire barcode with a single image from a single direction at a plurality of distances. In this example, a spherical cap area can be calculated by the Gauss-Bonnet theorem to be approximately one-third of the surface of a sphere, and the printing is embedded to cover one-third or less of the sphere. It will be appreciated that a sphere is merely an example physical object, and other physical objects may be embedded with contrast barcodes such that an image of the object is sufficient to decode the contrast barcode. Appropriate software coding can be readily prepared by skilled programmers to determine the placement of two-dimensional contrast barcodes onto three-dimensional physical objects based on the teachings of the present disclosure, as will be apparent to those skilled in the software art. Image 1010 of the contrast barcode and sphere is represented in diagram 1012. In some embodiments, optical markers may be placed within the contrast barcode to define encoding and reference axes. For example, three optical markers 1034 in diagram 1012 indicate an elliptical encoding axis intersecting the markers (e.g., encoding axis 1026 in diagram 1012) and a concentric reference axis 1028. In an example, a binary code is encoded in a single continuous sequence. In this example, method 1200 may start at an arbitrary point in the contrast barcode and decode the sequence to a binary code, then perform an exhaustive bitwise right rotation of the binary code until the binary code passes error detection or correction.

FIG. 10d illustrates a portable physical contrast barcode created for embedding onto an object at a later time. In an example, a two-dimensional physical printing of a contrast barcode sticker embedded onto a three-dimensional physical bottle is provided. Image 1014 of the contrast barcode and bottle is represented in diagram 1016. In some instances, the shape of a contrast barcode or optical markers may indicate a linear encoding axis beginning at an optical marker 1038, with a parallel reference axis 1030 immediately to the left of a contrast barcode 1032, as seen in diagram 1016. In an example, a binary code is encoded in a single continuous linear sequence. In this example, method 1200 may start at the marker 1038 and decode a sequence until the edge of the image 1014, then trim the end of the resulting binary code until a binary code passes error detection or correction. In another embodiment, method 1200 may use the size of an optical marker 1038 to determine the size of a contrast barcode and predict a stopping point. In yet another embodiment, method 1200 may use an edge detection technique (e.g., Canny edge detection) to determine when the contrast barcode ends. Further details of FIG. 10 will be described in conjunction with method 1200 in FIG. 12.

Figure 12:
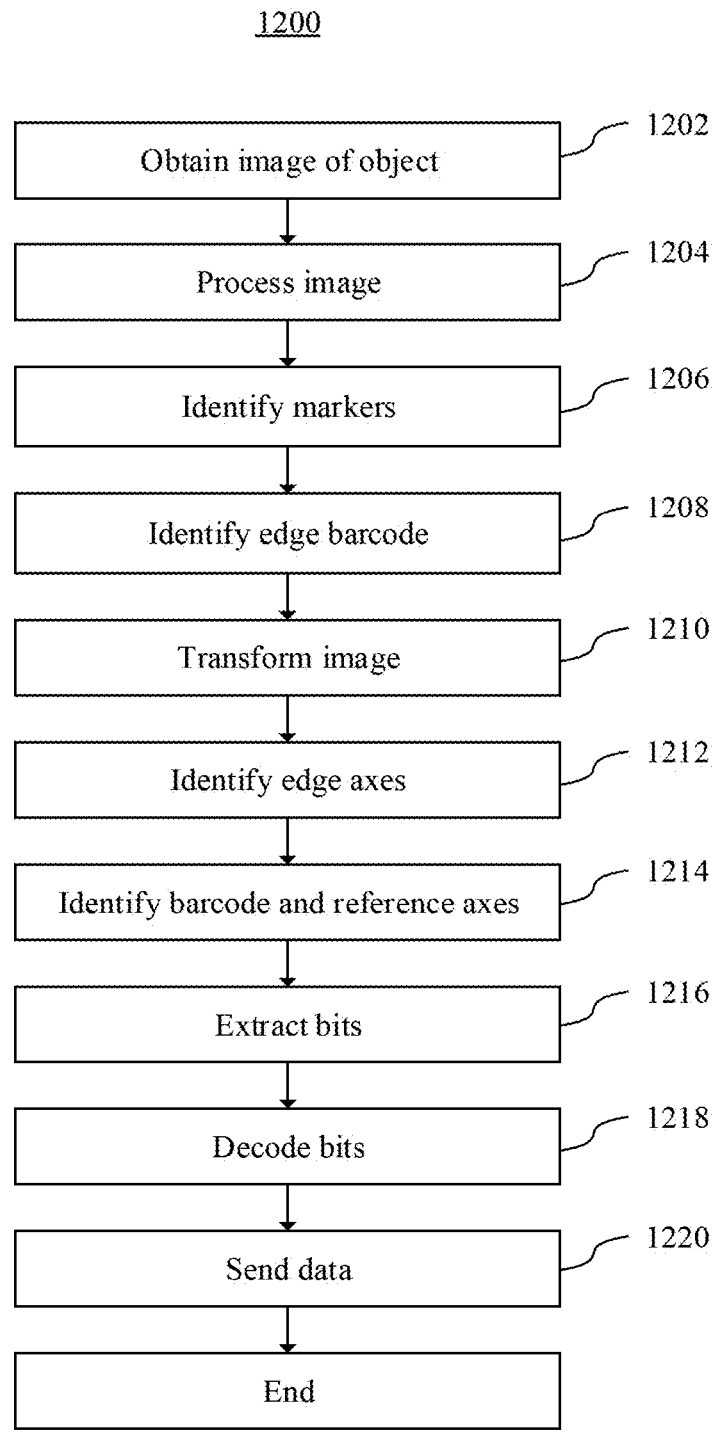
FIG. 12 illustrates a flow diagram illustrating an example method for decoding a contrast barcode, according to an embodiment of the present invention.

FIG. 11 illustrates examples of contrast barcode sequences, according to an embodiment of the present invention. FIG. 11 illustrates an example of an object sequence 1100 of unencoded objects, which may compose an unencoded video, and an encoded sequence 1102 of objects, which may compose an encoded video. In various embodiments, a sequence of multiple objects (e.g., a sequence of frames in a video, or a sequence of orientations of a lenticular print) may be embedded with contrast barcodes through an encoding method. If more than one object needs encoding, the operations of method 800 may be iteratively performed for each object (e.g., each frame in a video) using the same code for each iteration. By repeating method 800 for each object in the object sequence 1100, appropriate software coding can readily be prepared by skilled programmers to obtain the encoded sequence 1102 based on the teachings of the present disclosure, as will be apparent to those skilled in the software art. In an example embodiment, an image capture device 12 (FIG. 2) may capture an image 1104 of the sequence 1102 for decoding with method 1200 (FIG. 12). Further details of FIG. 11 will be described in conjunction with method 1200 in FIG. 12.

FIG. 12 illustrates a flow diagram illustrating an example method for decoding a contrast barcode, according to an embodiment of the present invention. FIG. 12 is a flow diagram illustrating an example method for decoding a contrast barcode. The method 1200 will be described in relation to the contrast barcode 906 in FIG. 9, but need not be so limited. The method 1200 begins with operation 1202, which involves obtaining an image of object 900. FIG. 9 illustrates an example of an image 902 that may be obtained. The image 902 may include the object 900 (e.g., a glass bottle), an optical marker 904, and a contrast barcode 906. It will be appreciated that the object 900 is merely an example object, and images may include other physical or digital objects with contrast barcodes.

At operation 1202, processor 31 (FIG. 3) receives image data of an image from a user device. For example, the processor 31 receives the image data from an optical sensor (e.g., a camera 26) of a smart phone of the user. In some embodiments, the processor 31 resides on a server 19, which receives the image via a PDN 16 (FIG. 1) or a RAN 18 from a camera 26. In various embodiments, the image data from the user device is received in response to a user-initiated image capture, a periodic monitoring of image data being detected by the optical sensor of the user device, or a combination thereof.

The image can be obtained in a variety of ways, such as by being captured by a camera (e.g., a CCD or CMOS image sensor of an image capture device) or selected from a library of photos. In some examples, the user can use a particular application to capture the contrast barcode, such as a software application configured to process contrast barcodes. In some embodiments, the image data represents an image or video being captured by the user device in substantially real time (e.g., a live image feed from a camera sensor of a smartphone). In other embodiments, the image data represents an image captured by the user device, or another device and stored on the user device, from a time in the past (e.g., a still image or video stored on the user device or downloaded from a PDN 16).

In some embodiments, the image data may be captured from a display screen (e.g., a computer screen, an electronic billboard display, or a television screen, among others). In other embodiments, the image data may be captured from a physical medium, such as paper, stickers, billboards, boxes, bottles, and other physical media. In embodiments where object 900 manifests as a sequence of contrast barcodes 906 (e.g., as a frame in a video or a particular orientation of a lenticular print), the image data may be captured from an individual frame of the sequence or a combination of multiple frames of the sequence. FIG. 11 illustrates an example of a sequence 1102 which may compose a video, and an image 1104 of the sequence 1102 captured with an image capture device 12.

As can be seen callout 51 (FIG. 5) or image 902 (FIG. 9), the image data may include extraneous or irrelevant data along with the data pertaining to the contrast barcode (e.g., an image of a contrast barcode includes a background that is not pertinent to decoding the contrast barcode). In an example embodiment, the image capture device 12 captures an image of an object 900 (e.g., a glass bottle) that includes a particular barcode 906. The image of the bottle can include the particular contrast barcode along with irrelevant portions of the bottle or background that surrounds the particular contrast barcode.

In some embodiments, multiple images may be obtained of a single object, with each image either decoded separately or digitally concatenated with other images for decoding. For example, an image capture device may pan across a large object and capture images that each encompass a subsection of the contrast barcode on the object. Appropriate software coding in the fields of feature matching or augmented reality can readily be prepared by skilled programmers to concatenate the data of multiple images and enable the detection and decoding methods described herein, as will be apparent to those skilled in the software art.

In some embodiments, a capture device may obtain data with or without image capture. For example, an object may be encoded with a contrast barcode utilizing a depth gamut, and the capture device may measure depth with a distance capture sensor. Appropriate software coding in the field of hardware sensing can readily be prepared by skilled programmers to translate depth measurements into digital data, and enable the detection and decoding methods as described herein, as will be apparent to those skilled in the software art.

At operation 1204, the obtained image is processed. This processing can include manipulating the image with an image processing library such as OpenCV to make it easier to process in later steps. For example, the image can be processed by converting it to grayscale, increasing or decreasing contrast, increasing or decreasing brightness, and reducing noise, among others. In some embodiments, the processor 31 generates a low-resolution copy of the image. The processor 31 can perform various image processing on the low-resolution copy of the image, such as a blur (e.g., a Gaussian blur function or another blur function) and a thresholding, to generate a modified low-resolution image. The thresholding image process can include adjusting lighter colors (e.g., as determined by a threshold or threshold range) of the low-resolution copy of the image to a white color and darker colors (e.g., as determined by a threshold or threshold range) of the low-resolution copy of the image to a black color, in order to improve detection of the optical marker in the image or improve computational efficiency of detecting a contrast barcode in an image. In further example embodiments, the processor 31 generates a high-resolution copy of a portion of the image. For instance, the processor 31 can generate the high-resolution copy of a particular portion of the image corresponding to the contrast barcode. The processor 31 can use the high-resolution copy for subsequent analysis, as described below, to improve detection, alignment, and decoding results.

At operation 1206, optical markers are detected in the image. In an example embodiment, detection can involve identifying the location of the optical marker 904 within the image 902. In this example, this may be done by testing for all possible locations within the image 902 and testing if there is a region (e.g., disc) of light or darkness at that point. In some examples, such a process can involve detecting a known shape of a marker using a shape detection algorithm, such as one found in OpenCV. For example, it may be predetermined that the marker 904 may have a circular shape, and the marker 904 may be detected by identifying circular shapes within the image. In another example, the process may involve object detection of known features in the optical marker by training and using a machine learning or deep learning object detection model, such as one found in TensorFlow Lite.

At operation 1208, the processor 31 identifies contrast barcode features from the image data. The contrast barcode features can be indicative of the detection of an object embedded with a contrast barcode (e.g., detecting a square or four optical markers may indicate a rectangular contrast barcode in the image).

In an example embodiment, the processor 31 performs an edge detection technique (e.g., Canny edge detection), or another image processing technique, to identify shape features such as contour lines or localized concentrations of color or shading of the image. Edge detection can be performed in a variety of ways, such as by using, for example, edge detection algorithms from a library such as OpenCV. In some embodiments, the processor 31 extracts multiple candidate shape features from the image data. In some embodiments, the candidate shape includes various shape feature data such as a position of the candidate shape relative to a boundary of the image, a brightness of the candidate shape relative to the image, and so forth.

The processor 31 determines that the candidate shape feature satisfies one or more shape feature criteria or rules. For instance, if a particular shape feature is a contour line, the processor 31 can determine whether the contour line is an enclosed line that encircles a portion of the image (i.e., a path that starts at a particular point and returns to the same particular point). Consistent with some embodiments, the shape feature rule filters out irrelevant or extraneous features. For example, a particular shape feature rule can be purposed to filter out candidate shape features with a low probability of containing the contrast barcode. In this example, the particular shape feature rule can be specific to the possible shapes of the contrast barcode.

In response to the candidate shape feature satisfying the shape feature rule, the processor 31 detects the optical marker in the image by comparing the candidate shape feature with reference shape features of possible contrast barcode shapes. For example, the processor 31 can compare an area or size of the candidate shape feature with a reference area or size of the reference shape feature. In this example, the finder module 230 detects the optical marker based on a match or near match (e.g., a percentage match above a threshold) between the candidate shape feature and the reference shape feature. In this way, the shape features are used a finder pattern to detect the presence of the contrast barcode within a portion of the image.

The processor 31 may extract multiple candidate shape features from the image data. The processor 31 may score each candidate shape feature and ranks the multiple candidate shape features according to respective scores. For example, the processor 31 determines a shape feature score for respective candidate shape features based on a count, or weighted count, of shape feature rules the respective candidate shape feature satisfies. The feature rules may include an area value or size approximation of the candidate shape feature. The processor 31 can iterate through the ranked candidate shape features starting with the highest scoring candidate shape feature and perform further analysis (e.g., comparing the candidate shape feature to a reference shape feature) to determine that the candidate shape feature contains a contrast barcode.

In other embodiments, the candidate shape can be determined by optical markers, shape features, contour lines, or any combination thereof. The processor 31 may detect a contrast barcode in the image in conjunction with optical markers detected in operation 1206 or other candidate shape features extracted from the image data. It will be appreciated that shape features are merely an example detection technique, and patterns of optical markers (which may have been detected in operation 1206), contour lines, or other visual features may also be indicative of the detection of an object embedded with a contrast barcode. Appropriate software coding can readily be prepared by skilled programmers based on the teachings of the present disclosure, as will be apparent to those skilled in the software art. For example, the detection of at least one optical marker may suggest that the image contains a contrast barcode. In another example, a combination of detection techniques is used, and the processor 31 can search for optical markers, an outer box surrounding the optical markers, and reference shapes within the outer box to determine the existence of a contrast barcode. In some embodiments, the rules and techniques to detect contrast barcodes may be received by the processor 31 from a PDN 16.

At operation 1210, the image is straightened or otherwise de-skewed. For example, where the image is based on a photo of a contrast barcode taken by a user, the image will likely have some skew (e.g., not have been taken straight-on). In some embodiments, the markers detected in operation 1206 or the shape detected in operation 1208 form a quadrilateral, and the skew can be corrected using, for example, perspective correction features (e.g., four-point transform) of a library such as OpenCV. In other embodiments, the shape detected in operation 1208 matches a reference shape and the processor 31 generates a transformed image by transforming the image according to the orientation of the reference (e.g., a square in FIG. 10*a*). For instance, the processor 31 can rotate, de-skew, scale, or otherwise spatially transform the image to allow for a more accurate decoding of the data in the image. The processor 31 may compare the candidate shape and the reference shape to determine an alignment including an orientation, scale, or position. The processor 31 can determine perspective changes based on a mismatch between the candidate shape and the reference shape. The processor 31 may use the mismatch to infer or determine a perspective of the image or other spatial attributes of the image that can be utilized by the processor 31 to more accurately decode data from the image. In yet another embodiment, the image does not need to be transformed due to the quality of the image or robustness of the detecting and decoding methods of the present disclosure.

At operation 1212, the edge axes for decoding are identified in the image. Turning now to FIG. 10*c* as an example embodiment, an image 1010 of a three-dimensional object may be provided for decoding (e.g., a sphere, as captured in the image 1010). In some embodiments, optical markers may have been placed within the contrast barcode to help define decoding and reference axes based on a set of rules. In this example embodiment, the three optical markers in the contrast barcode in image 1010 in FIG. 10*c* indicate that there exists one elliptical decoding axis intersecting the markers (e.g., the decoding axis 1026 in FIG. 10*c*), and there exists a concentric reference axis 1028. In some embodiments, the rules and techniques to identify edge axes may be received by the processor 31 from a PDN 16.

Turning now to FIG. 6 as another example embodiment, the four optical markers (including the bottom-right optical marker 604) in the contrast barcode 602 may indicate that there exists four decoding axes between the markers, and that there exists four reference axes parallel to the decoding axes. Additionally, the four optical markers at the corners of a quadrilateral may indicate a rectangular contrast barcode with four axes, with a clockwise decoding pattern starting at the top edge. In this example, operation 1206 detects four optical markers that form a quadrilateral, operation 1210 transforms the quadrilateral into a rectangle, and each edge of a transformed rectangle may compose an axis. In various embodiments, the styles, sizes, or placement of optical markers help define decoding and reference axes (e.g., two large red optical markers may indicate cross-shaped encoding and reference axes), and the rules relating optical markers with decoding algorithms may be received from a code generator 13 via a PDN 16.

In other embodiments, the axes may be determined by shapes identified in the image. For example, a circle may indicate a single nonlinear axis along the circumference, with a clockwise decoding pattern starting at an arbitrary point on the circumference. In this example, operation 1208 detects an ellipsis, operation 1210 transforms the ellipse into a circle, and a concentric ring within the circle is identified as an axis. In various embodiments, the shape of a contrast barcode helps define decoding and reference axes, and the rules relating contrast barcode shapes with decoding algorithms may be received from a code generator 13 via a PDN 16.

In yet another embodiment, the axes may be determined by contour lines in the image. For example, an enclosed contour line that encircles a portion of an image may form an irregular polygon, and each edge in an irregular polygon may compose an axis. In this example, operation 1208 detects a shape that does not match a reference shape, so the edges of the shape are implied as the axes. In various embodiments, the contour lines in a contrast barcode help define decoding and reference axes, and the rules relating contrast barcode contour lines with decoding algorithms may be received from a code generator 13 via a PDN 16.

In various embodiments, the axes may be determined by a combination of optical marker positions, reference shapes, and contour lines. For example, three optical markers in an image may indicate a circular axis that may be detected with shape detection and contour lines. In this example, operation 1206 detects three optical markers, operation 1208 detects the largest ellipsis that encloses these markers, and operation 1208 detects an enclosed contour line within this ellipsis as the axis. In another example, one optical marker may indicate a single linear axis that may be detected with shape detection. In this example, operation 1206 detects a single optical marker, operation 1208 identifies the tallest quadrilateral with two points within a certain threshold of points on the optical marker, and the line from the optical marker to the opposing side of the quadrilateral may be the axis.

Turning now to FIG. 9 as another example embodiment, operation 1212 determines a single edge axis 918 in the image. An encoding axis 908 along the contrast barcode 906 is defined as beginning at an optical marker 904 and continuing upwards parallel to axis 918. The position and direction of edge, encoding, and decoding axes may be determined by rules that may be received from a code generator 13 via a PDN 16.

It will be appreciated that rectangles, circles, and irregular polygons are merely example shapes, and axes on other shapes may be detected or transformed using the techniques described herein. By utilizing appropriate image processing or computer vision software libraries, appropriate software coding to determine axes can readily be prepared by skilled programmers based on the teachings of the present disclosure, as will be apparent to those skilled in the software art.

At operation 1214, contrast barcode sections (herein called "sectional barcodes") and reference axes for decoding are identified in the image. In some embodiments, there can be a number of bits that have been formed on an edge from the encoding of the object, which can be extracted by comparing the pixels along a sectional barcode axis, with the pixels along a reference axis. Turning back to FIG. 9 as an example, a reference axis 910 along the original object 900 is defined as an axis parallel to the edge axis 918 such that the edge axis 918 is equidistant from the encoding axis 908 and the reference axis 910.

In other embodiments, an image may contain more than one axis, and each axis may be decoded individually. In an example, for a given axis of length x0, aggregate length of axes xt, and binary data of length nt, the number of bits n0 expected per axis may be proportional to the axis length, given by n0=(x0/xt)*nt. In an example, a contrast barcode comprises four axes arranged in a rectangle, and the widths and heights of blocks within each sectional barcode axis may be calculated by dividing the axis length x0 by the number of bits per axis n0. In this example, a midpoint for each block in a barcode axis may be calculated from its width and height. The sectional barcode axis may be identified as a line parallel to an edge axis intersecting a plurality of block midpoints. A reference axis is defined as an axis parallel to an edge axis such that an edge axis is equidistant from a reference axis and a sectional barcode axis. The axes lengths may be a fixed proportion to the block sizes, and the axes lengths may be used to determine when a contrast barcode ends along an axis.

In some embodiments, the axes lengths may be calculated by the optical marker size. For example, the length of an axis may be directly proportional to the size of an optical marker or marking block, so the end of the axis may be predicted by multiplying a marker or block length. It will be appreciated that a contrast barcode may contain any number of sectional barcodes and reference axes, linear or nonlinear. By utilizing optical markers or shape dimensions, appropriate software coding to detect sectional barcode and reference axes from edge axes can readily be prepared by skilled programmers based on the teachings of the present disclosure, as will be apparent to those skilled in the software art.

At operation 1216, bits are extracted along the sectional barcode and reference axes in the image. In an example embodiment, for a plurality of points along a sectional barcode or reference axis, a median color near each point may be calculated. For example, for each point, a pixel region perpendicular to a sectional barcode or reference axis may be identified, with a height and width equal to an optical marker or sectional barcode block (as determined in operation 1214). The median color of the pixels along a secondary axis may be identified by calculating average RGB values among all the pixels in the region, calculating median RGB values among the pixels, or applying a blur to the pixels and choosing an arbitrary pixel.

Turning now to FIG. 9 as an example embodiment, callout 912 shows an enlarged portion of image 902 that includes three reference blocks and three contrast barcode blocks, with reference block 914 and new marking block 916 forming a pair. The contrast barcode may be partially transparent and embedded onto a surface with relatively uniform colors, effectively tinting the surface with contrast barcode markings 906. The tint of the contrast barcode markings 906 may be measured against reference blocks on the object surface, perpendicular to the decoding axis 918 at the edge of markings 906. As shown in the callout 912, the block 916 of contrast barcode markings 906 effectively encodes the bits 934 (i.e., 5 or 0b101) by tinting RGB values relative to reference block 914.

In one embodiment, the red, green, and blue values of the median color of each sectional barcode point are each subtracted from the red, green, and blue values of the median color of each reference point. For each red, green, and blue result, a positive result resolves to a 1, and a negative result resolves to a 0, such that each sectional barcode point decodes to three bits. In another embodiment, the brightness of the median color of each sectional barcode point is subtracted from the brightness of the median color of each reference point. A positive result resolves to a 1, and a negative result resolves to a 0, such that each sectional barcode point decodes to one bit.

Callout 936 shows an enlarged portion of callout 912 indicating the colors of the individual pixels within the blocks. Each reference block A, B, and C contains four pixels A1, A2, A3, and A4; B1, B2, B3, and B4; and so on, respectively. Similarly, each new marking block A', B', and C' contains four pixels A'1, A'2, A'3, and A'4; B'1, B'2, B'3, and B'4; and so on, respectively. Each pixel is labeled with its RGB values in parentheses. For example, the pixel A3 has a red value of 134, green value of 178, and blue value of 134. The binary code 926 (i.e., 336 or 0b101010000) was encoded into the contrast barcode 906 three bits at a time, starting with bits 924 (i.e., 5 or 0b101), followed by bits 922 (i.e., 2 or 0b010) and bits 930 (i.e., 0 or 0b000).

Blocks C'1 and C'2 in callout 936 may be tinted relative to blocks C1 and C2, with C1 and C'2 forming a pair with C1 and C2 since they all lie on an axis perpendicular to the decoding axis 918. In this example, C'1 and C'2 may be tinted according to a bit code to encode, and the brightening of median red, darkening of green, and brightening of blue values relative to reference blocks C1 and C2 may indicate a bit code of 101 (labeled as 934 in FIG. 9) for a point on the decoding axis. Similarly, C'3 and C'4 may also indicate a bit code of 101 at an adjacent point on the decoding axis.

While some bit codes detected in the image 902 may not exactly match the bit codes originally encoded, in value or enumeration due to image noise (e.g., shadows on the object or electronic noise), techniques described in operation 1218 may remedy these errors. In this example, detected bit codes exactly match the encoded bit codes to simplify explanations (i.e., no noise exists in the image 902), but it will be appreciated that the method herein is robust to image noise.

In some embodiments, a bit code may be constructed by iterating along an edge axis and comparing median colors of adjacent sectional barcodes and reference points. In one embodiment, an iteration begins at the start of an axis, with each step in an iteration comprising a single pixel, and ending at the end of an axis. Turning again to FIG. 9 as an example, the pixels C'3 and C'4 may decode to 101, the pixels C'1 and C'2 may decode to 101, the pixels B'3 and B'4 may decode to 010, and so on, along an encoding axis 918 that lies parallel to the edge axis 918 and adjacent to the reference axis 910. In this example, the bit codes obtained (e.g., decoded codes 930, 932, and 934) may be represented as an ordered list of bit codes, such as [101, 101, 010, 010, 000, 000].

It will be appreciated that color value comparisons are provided here merely as an example, and other techniques may be used to decode contrasting colors. In some embodiments, a transparent contrast barcode is embedded onto a physical surface, and the principles of subtractive color mixing result in an extra darkening of contrast barcode markings relative to reference blocks. In this example, the opacity of a transparent contrast barcode may be subtracted from detected color values within an image of contrast barcode markings, which may correct for an offset before color comparisons. It will also be appreciated that the RGB color model used is merely an example color model, and one or more bits may be decoded using other color models such as CMYK, HSL, or HSV.

In some embodiments, contrast and comparisons between one or more gamut attributes or properties may be used to encode one or more bits. In some embodiments, the combination of gamut properties/attribute contrast/comparison may be used for binary, ternary, quaternary and nary encoding/decoding of the barcode markings. Additionally, other gamuts may be used in the encoding and decoding of barcode markings such as depth and disparity of stereoscopic images. This may be used in combination with 3D TVs, stereoscopic displays, autostereoscopic displays, head mounted displays (HMDs) or any combination thereof. The techniques described herein for color contrast encoding and decoding can be applied to contrast encoding and decoding in other gamuts such as depth, as will be apparent to those skilled in the software art.

It will also be appreciated that the image 902 is provided merely as an example, and in some embodiments, an image may be obtained of a contrast barcode with more than one axis, such as in callout 53 (FIG. 5). It will be appreciated that the operations 1214 and 1216 may be repeated for each axis to obtain multiple lists of bit codes, which may be concatenated to a single ordered list of bit codes. Turning to callout 53 (FIG. 5) as an example, operations 1204, 1206, 1208, and 1210 may detect a contrast barcode in an image and result in a transformed contrast barcode 55 (FIG. 5). In this example, operations 1212 and 1214 may identify four edge, decoding, and reference axes in the contrast barcode 55. In this example, operation 1216 may process the four decoding axes in a clockwise fashion, starting at the top axis, to create four lists of bit codes. These lists may be concatenated in order to create a single ordered list of bit codes.

At operation 1218, the bit codes from the decoding axes are further decoded to a single error-corrected bit code. The statistical techniques described herein may enable the proper decoding of an image despite image noise, though no image noise exists in these examples. Turning again to FIG. 9 as an example embodiment, an ordered list of decoded bit codes (e.g., decoded codes 930, 932, and 934) such as [101, 101, 010, 010, 000, 000] may be obtained from a decoding process. In this example, multiple pixels (e.g., C'1, C'2, C'3, and C'4) may all compose a single contrast barcode marking block that encodes three bits, but a pixel-by-pixel decoding of operation 1216 may result in a list of decoded bit codes that contain repeated bit codes. As an example, the decoded bit codes [101, 101, 010, 010, 000, 000] may need to be compressed to the binary code 926 (i.e., 336 or 0b101010000). In some embodiments, the lengths of repeating contiguous subsequences may be used to estimate the number of pixel bit codes that compose a contrast barcode marking block. In one embodiment, the mode length of repeating contiguous subsequences may indicate the number of pixel bit codes that compose a contrast barcode marking block. In an example, a list [101, 101, 010, 010, 000, 000] has three repeating contiguous subsequences, each with a length 2 ([101, 101], [010, 010], and [000, 000]), for a mode length of two. In this example, every two decoded bit codes in a list may be compressed to a single bit code, resulting in a compressed list [101, 010, 000] (corresponding to intended bits 924, 922, and 920 in FIG. 9, respectively) that may be concatenated to create the binary code 926 (i.e., 336 or 0b101010000). It will be appreciated that compression using subsequence length modes is merely an example method, and skilled programmers may prepare other methods based on probability theory or regression analysis to detect and compress continuous repeated bit codes, as will be apparent to those skilled in the software art.

In some embodiments, the order and direction of edge axes are not deterministic, so exhaustive permutations of axis bit codes are concatenated until a permutation passes an error correction verification. In various embodiments, the axis bit codes may be reversed, rotated, padded, or trimmed before permuting to correct for direction, orientation, or errors. Some examples of these embodiments, and example techniques to decode them, are described in relation to FIG. 10 (e.g., the right bit rotation described for FIG. 10b). Other embodiments may exploit the positioning or orientation of axis bit codes, such as with the clockwise decoding of rectangles along four axes described herein.

In some cases, the Reed-Solomon Error Correction algorithm is implemented. Reed-Solomon error correction is an error-correcting code. It works by oversampling a polynomial constructed from the data. The polynomial is evaluated at several points, and these values are sent or recorded. Sampling the polynomial more often than is necessary makes the polynomial over-determined. As long as it receives a certain number of the points correctly, the original polynomial can be recovered even in the presence of a few incorrect points.

Reed-Solomon codes are examples of error correcting codes, in which redundant information is added to data so that it can be recovered reliably despite errors in transmission or storage and retrieval. In a simple example, a message that includes a single character a is encoded three times as aaa. If one of the characters is decoded or stored incorrectly (e.g., the message reads baa, aba, or aab) the correct character "a" can still be recovered by taking a majority vote. However, the above technique may be inefficient because it requires three times the number of characters in the message to be stored. In some cases, a strategy for decoding any error correcting code is, if we receive a word B that is not a codeword, to find the codeword A that is "closest" to B. and then decode A to get the message. The "closest" codeword to B may be the codeword with the lowest Hamming distance from B, where the Hamming distance from B to A is the number of bits in B that are to be changed to get A.

In an embodiment, a permutation passes Reed-Solomon Error Correction and the original error-corrected bit code is recovered from the extracted bits. In some examples, the bits themselves are usable content. In some examples, the bits are converted into a different representation, encoding, or format for use. For instance, the bits can be converted into or otherwise treated as characters, a number, or other kinds of content.

The error-corrected content extracted from the contrast barcode can be used in a variety of ways. In some examples, the operation 1220 can include an interaction with a server 19, which may be associated with a display 4 that generates and publishes the contrast barcode. The server 19 may include a reference table that associates identifiers with content. This can facilitate the sharing of information with a contrast barcode by allowing the display 4 to provide a barcode with an identifier rather than the content itself. This can provide a variety of benefits. In one example, the use of a reference table can allow for reduced size of the content needed to be conveyed by the contrast barcode by allowing a relatively smaller identifier to be associated with a relatively longer item of content. For example, the contrast barcode may need only contain the identifier rather than a lengthy piece of content. In another example, this may provide improved security where a user may need to be authenticated prior to using the reference table to look up the content to which the identifier refers.

How the content is used can vary based on the type of content. For example, the content can be put into a text field (e.g., where the content is a WI-FI password, the content can be placed into a password field) of an application on the image capture device 12, the content can be added to a data structure (e.g., where the content is contact information), the content can be used to take a particular action (e.g., open an application), or access particular content (e.g., access a website), among others. In some examples, the use of the content can involve cooperation between the image capture device 12 and the server 19.

It should be apparent from this description that aspects of the present invention may be embodied, at least in part, in software. The techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing the invention described herein will be apparent to those skilled in the art. Although the present invention has been described with reference to specific exemplary embodiments, it will be evident that various modifications and changes may be made to these embodiments without departing from the broader spirit and scope of the invention as set forth herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for generating an optical machine-readable barcode, the method comprising: obtaining, by a processor, an object and data associated with the object;
   generating, by the processor, an error-corrected code of said data;
   determining, by the processor, a number of bits of the error-corrected code to encode on one or more axes of the object;
   determining, by the processor, a graphical representation of each bit, wherein the data stored in the bit corresponds to increases or decreases to one or more gamut values;
   encoding, by the processor, one or more blocks with the graphical representation of each bit, wherein the encoded blocks are sized to fit sequential to other encoded blocks;
   generating, by the processor, a barcode for each axis, wherein each barcode comprises one or more encoded blocks;
   the generating of each barcode comprises:
      generating one or more sectional barcodes, wherein the sectional barcodes are comprised of one or more encoded blocks wherein each encoded block is placed sequential to another encoded block; and
      placing, along an axis, the one or more sectional barcodes; and
   embedding each barcode onto or alongside the object.

2. The method of claim 1, wherein the object is a two or three-dimensional digital or physical object.

3. The method of claim 1, wherein the object comprises nonlinear or three-dimensional sides.

4. The method of claim 1, further comprising data with each bit of said data corresponding to increases or decreases to gamut values.

5. The method of claim 1, wherein the gamut of each block is individually adjusted to contrast against an adjacent section of the object, with the difference in gamut value determined by the bit to encode.

6. The method of claim 5, wherein each block is generated dependent of the object, and:
   for each intended block, determine starting and ending positions of the intended block, along an axis parallel to an object's side;
   determine the height of each intended block;
   determine a section of the object adjacent to said positions along the side, with the said height; and
   adjust the gamut value of the section to encode a bit.

7. The method of claim 5, wherein each block is generated independent of the object;
   for each intended block, create a transparent section; and
   adjust the gamut value of the section to encode a bit.

8. A capture device for reading an optical machine-readable barcode, the system comprising:
   a processor;
   a memory storage unit, storing instructions executable by the processor;
   one or more image sensors;
   a display;
   wherein the capture device is configured to:
      capture, using the one or more sensors, one or more digital representations of an object;
      generate, for each of a plurality of orientations of the digital object, a scannable object comprising a plurality of barcodes;
      identify an area in the scannable objects, wherein the area comprises a contrast barcode;
      determine that the area having the contrast barcode exceeds a matching threshold;
      identify, within the area, one or more optical markers and one or more object features;
      define barcode axes and reference axes from optical markers and object features;
      define a plurality of axis points along each axis;
      determine a barcode gamut value for each axis point;

determine a reference gamut value, wherein the reference gamut value is a median color value of an area surrounding each axis point;

translate differences in barcode color values and reference color values into bits;

concatenate bits from each axis into a singular binary code;

apply error correction to the singular binary code to extract an embedded code from the image; and store the embedded code to the memory.

9. The system of claim 8, wherein determining that the object exceeds the matching threshold comprises:

determining a match value that describes a confidence that the digital representation of the object's edges contains an optical machine-readable barcode;

detecting edges or optical machine-readable markers on the image of the object; and determining that the match value exceeds a preconfigured threshold for an attribute.

10. The system of claim 8, further comprising linear or nonlinear boundary axes.

11. The system of claim 8, further comprising bitwise representations of differences in gamut values with each bit of said data corresponding to increases or decreases to individual gamut values.

12. The system of claim 8, the operations further comprising:

transmitting, over a network, a request for content to one or more servers, the request comprising an object identifier from the image; and receiving the content over the network; and displaying the content on the display.

13. The system of claim 8, wherein the image capture device is a smartphone having a digital camera.

14. A non-transitory computer-readable storage medium comprising instructions which, when executed by hardware processing circuitry, configure the hardware processing circuitry to perform a method comprising:

obtaining, by a processor, an object and data associated with an object;

generating, by the processor, an error-corrected code of said data;

determining, by the processor, a number of bits of the error-corrected code to encode on one or more axes of the object;

determining, by the processor, a graphical representation of each bit, wherein the data stored in the bit corresponds to increases or decreases to one or more color values;

encoding, by the processor, one or more blocks with the graphical representation of each bit;

generating, by the processor, a barcode for each axis, wherein each barcode comprises one or more encoded blocks;

embedding, in an embedded object, each barcode onto or alongside edges of the object;

displaying, on a display device, the embedded object;

capturing, by a client device, one or more digital representations of the object;

the client device comprising:

a processing unit;

a memory storage unit, storing instructions executable by the processing unit;

one or more sensors; and a display;

generating, for each of a plurality of orientations of the digital representations, a scannable object comprising a plurality of barcodes;

identifying an area in the scannable images, wherein the area comprises a contrast barcode;

determining that the area having the contrast barcode exceeds a matching threshold;

identifying, within the area, one or more optical markers and one or more object features;

defining barcode axes and reference axes from optical markers and object features;

defining a plurality of axis points along each axis;

determining a barcode color value for each axis point;

determining a reference gamut value, wherein the reference gamut value is a median color value of an area surrounding each axis point;

translating differences in barcode color values and reference color values into bits;

concatenating bits from each axis into a singular binary code;

applying error correction to the singular binary code to extract an embedded code from the image;

transmitting, over a network, a request for content to one or more servers, the request comprising an object identifier from the image, wherein the object identifier comprises the embedded code from the image;

receiving the content over the network; and displaying the content on the client device display.

* * * * *